(12) United States Patent
Fujimura et al.

(10) Patent No.: US 8,797,831 B2
(45) Date of Patent: Aug. 5, 2014

(54) SUSPENSION BOARD WITH CIRCUIT

(71) Applicant: Nitto Denko Corporation, Osaka (JP)

(72) Inventors: Yoshito Fujimura, Osaka (JP); Jun Ishii, Osaka (JP); Terukazu Ihara, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 14/087,465

(22) Filed: Nov. 22, 2013

(65) Prior Publication Data

US 2014/0153373 A1 Jun. 5, 2014

Related U.S. Application Data

(60) Provisional application No. 61/738,010, filed on Dec. 17, 2012.

(30) Foreign Application Priority Data

Dec. 3, 2012 (JP) ................................. 2012-264216

(51) Int. Cl.
 *G11B 11/00* (2006.01)
(52) U.S. Cl.
 USPC ..................................... 369/13.32; 369/13.34

(58) Field of Classification Search
 None
 See application file for complete search history.

(56) References Cited

U.S. PATENT DOCUMENTS

| | | | |
|---|---|---|---|
| 2009/0266789 A1 | 10/2009 | Shimazawa et al. | |
| 2012/0092794 A1* | 4/2012 | Ohsawa | 360/246.2 |
| 2012/0092836 A1* | 4/2012 | Ohsawa | 361/748 |
| 2014/0029398 A1* | 1/2014 | Ohsawa et al. | 369/13.32 |

FOREIGN PATENT DOCUMENTS

JP       2009-266365 A       11/2009

\* cited by examiner

*Primary Examiner* — Paul Huber
(74) *Attorney, Agent, or Firm* — Jean C. Edwards; Edwards Neils PLLC

(57) ABSTRACT

A suspension board with circuit is for mounting thereon a slider/light source unit provided with a slider on which a magnetic head is mounted, and a light source device including a main body, and a light source provided to protrude from the main body. The suspension board with circuit includes a receiving portion formed therein to be capable of receiving the light source, and a guide surface for guiding the light source to the receiving portion when the slider/light source unit is mounted.

3 Claims, 16 Drawing Sheets

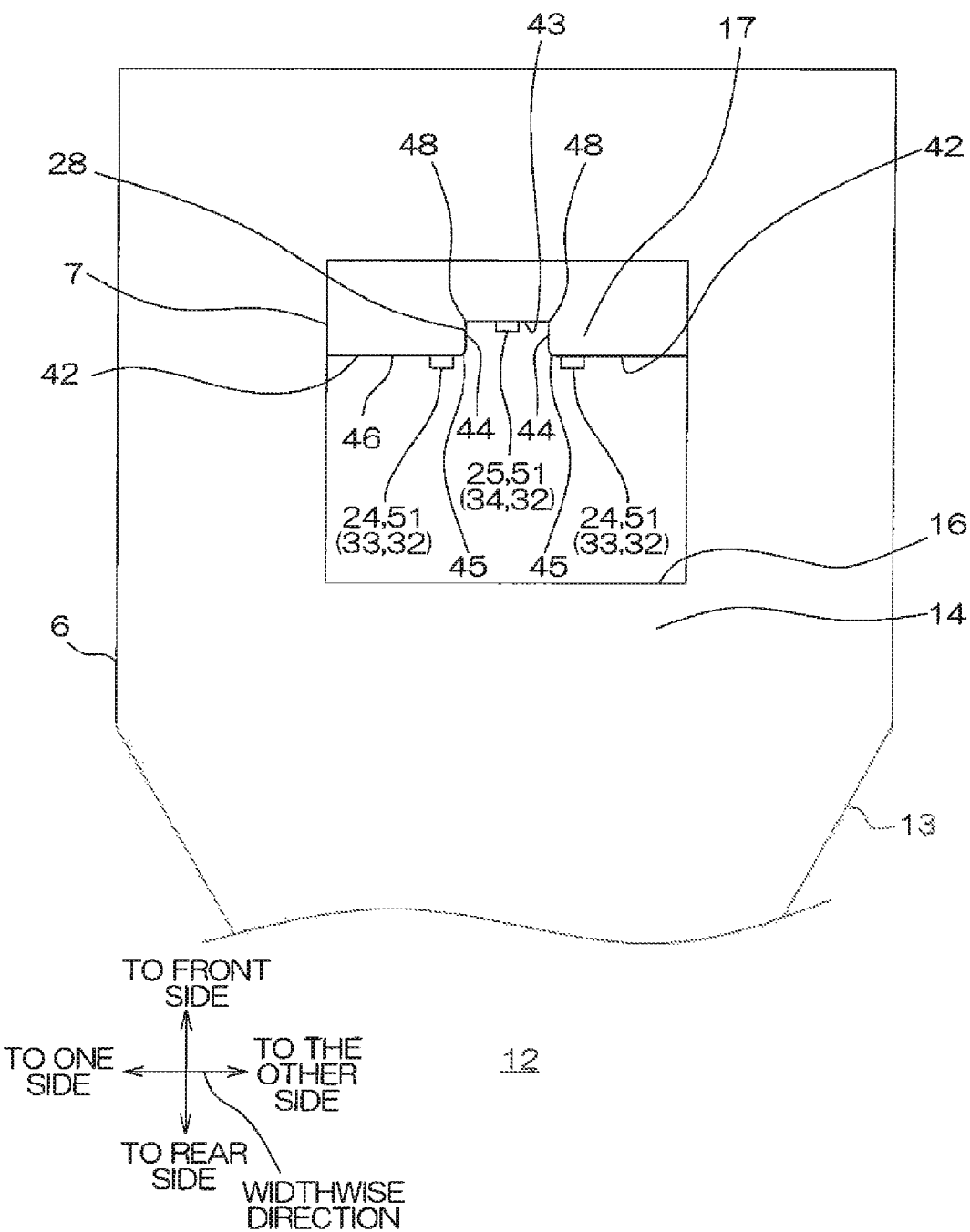

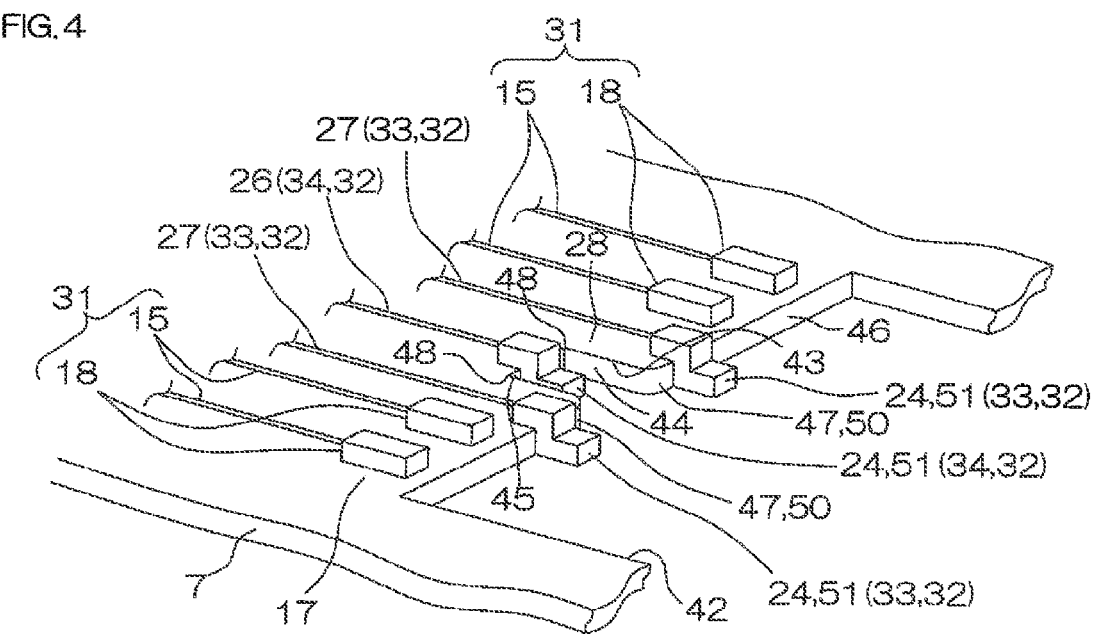

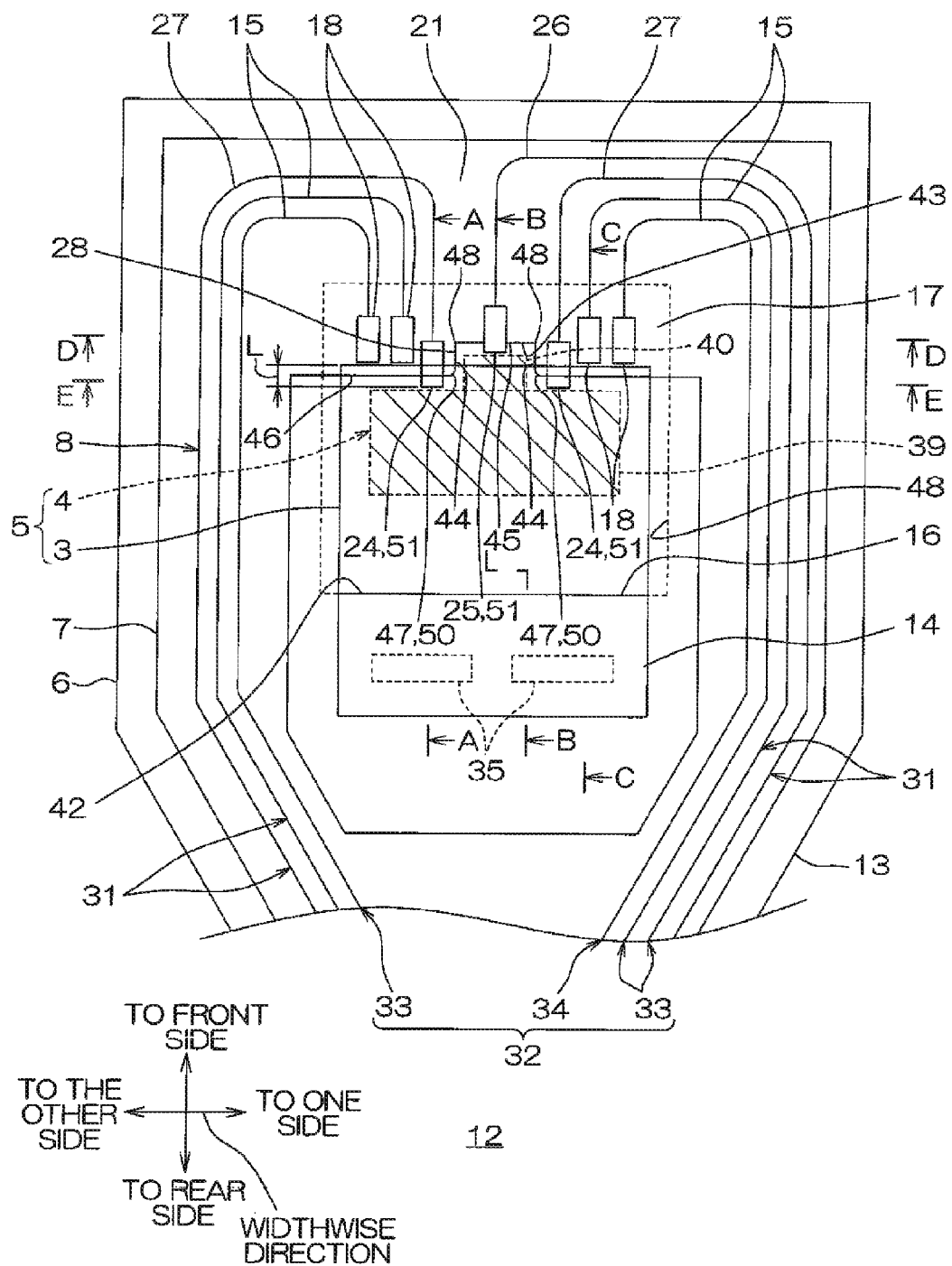

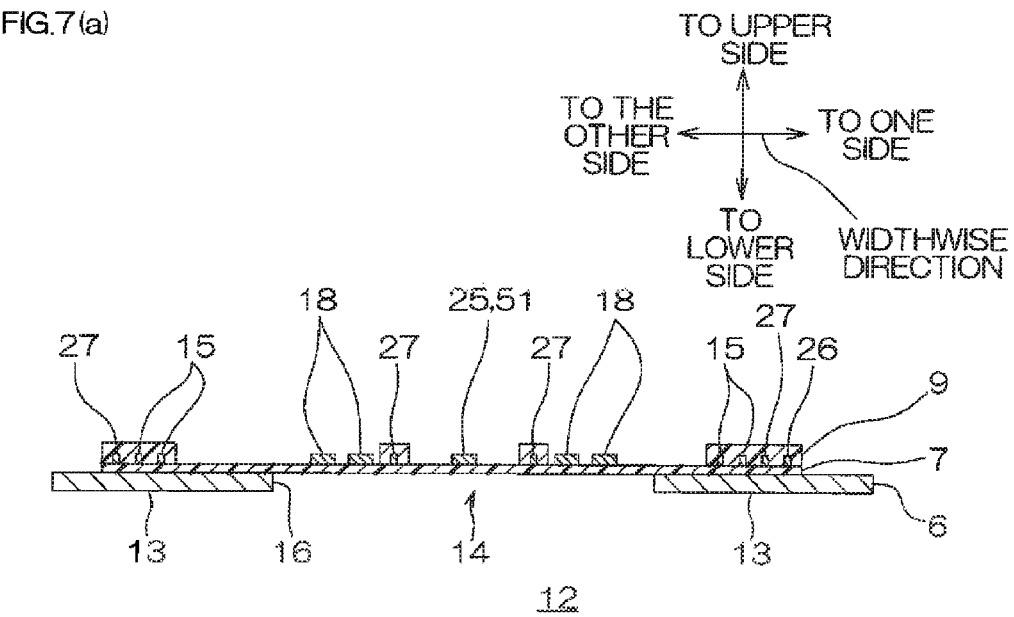
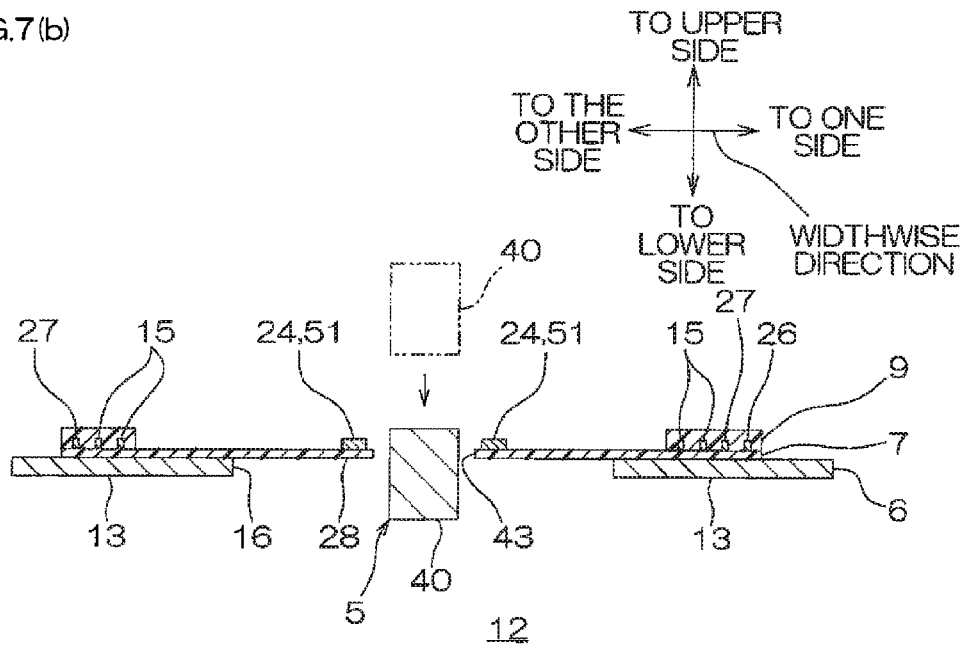

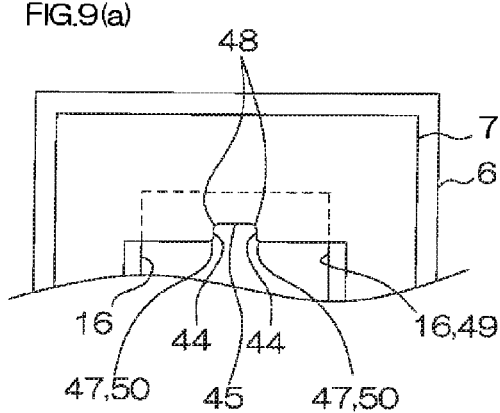
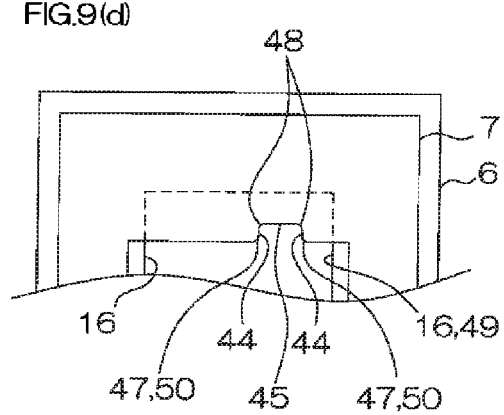
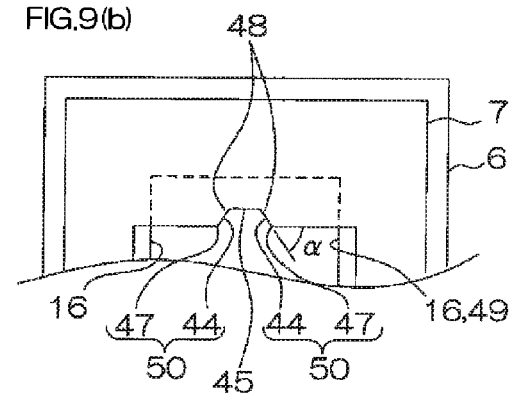
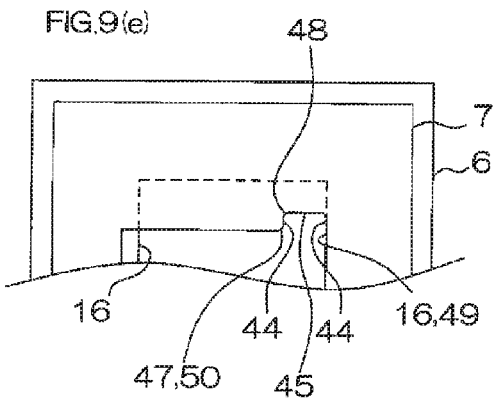
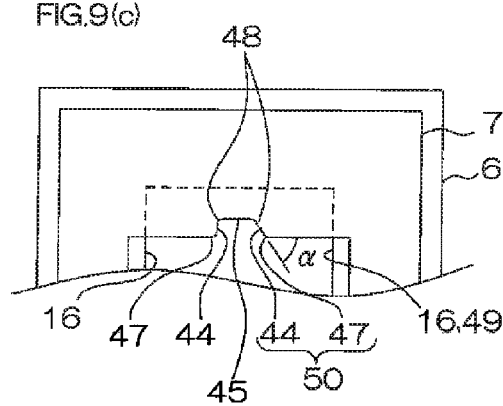
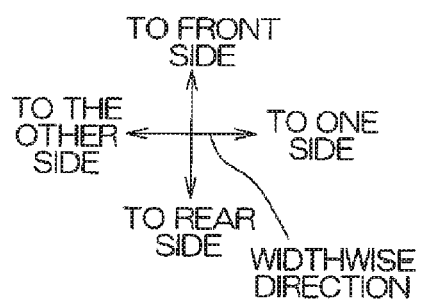

FIG.11
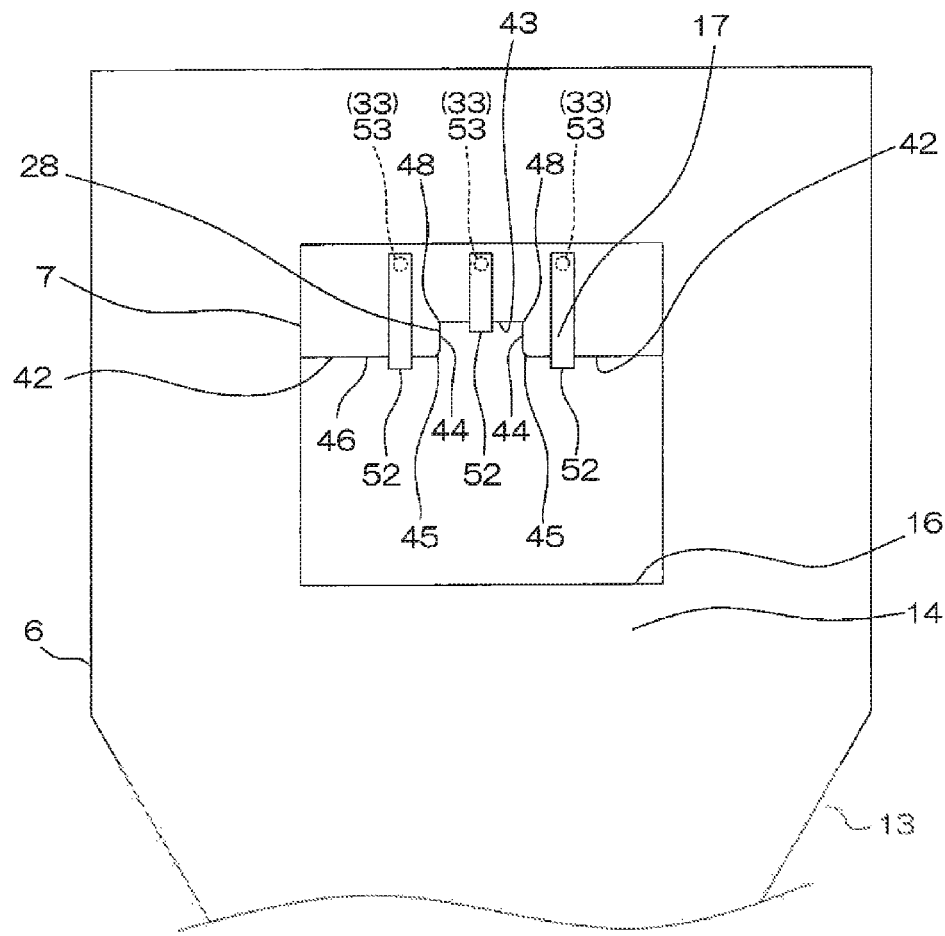
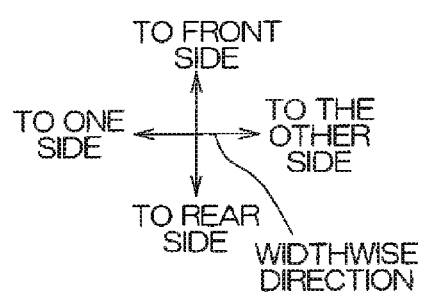

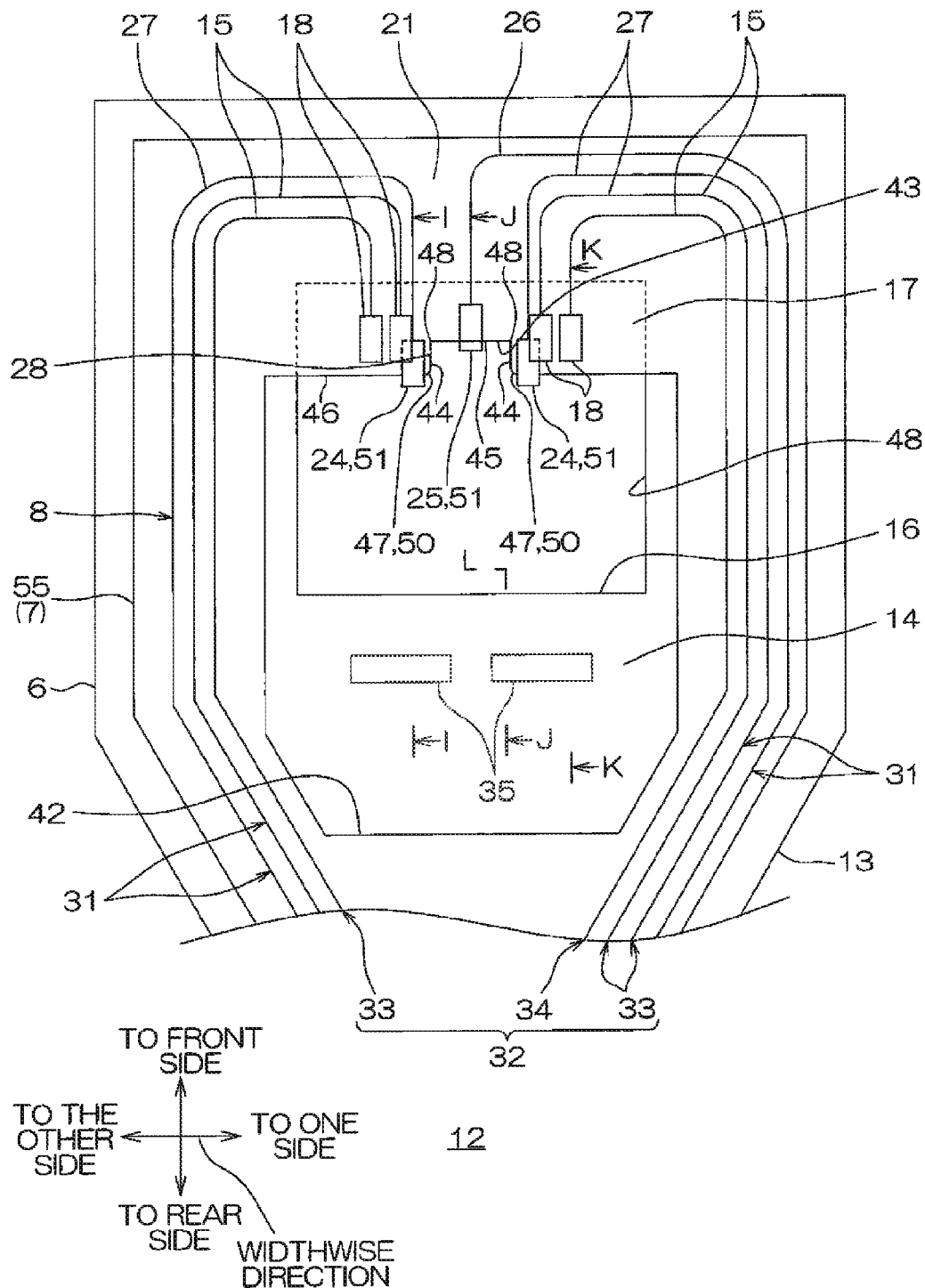

FIG.14
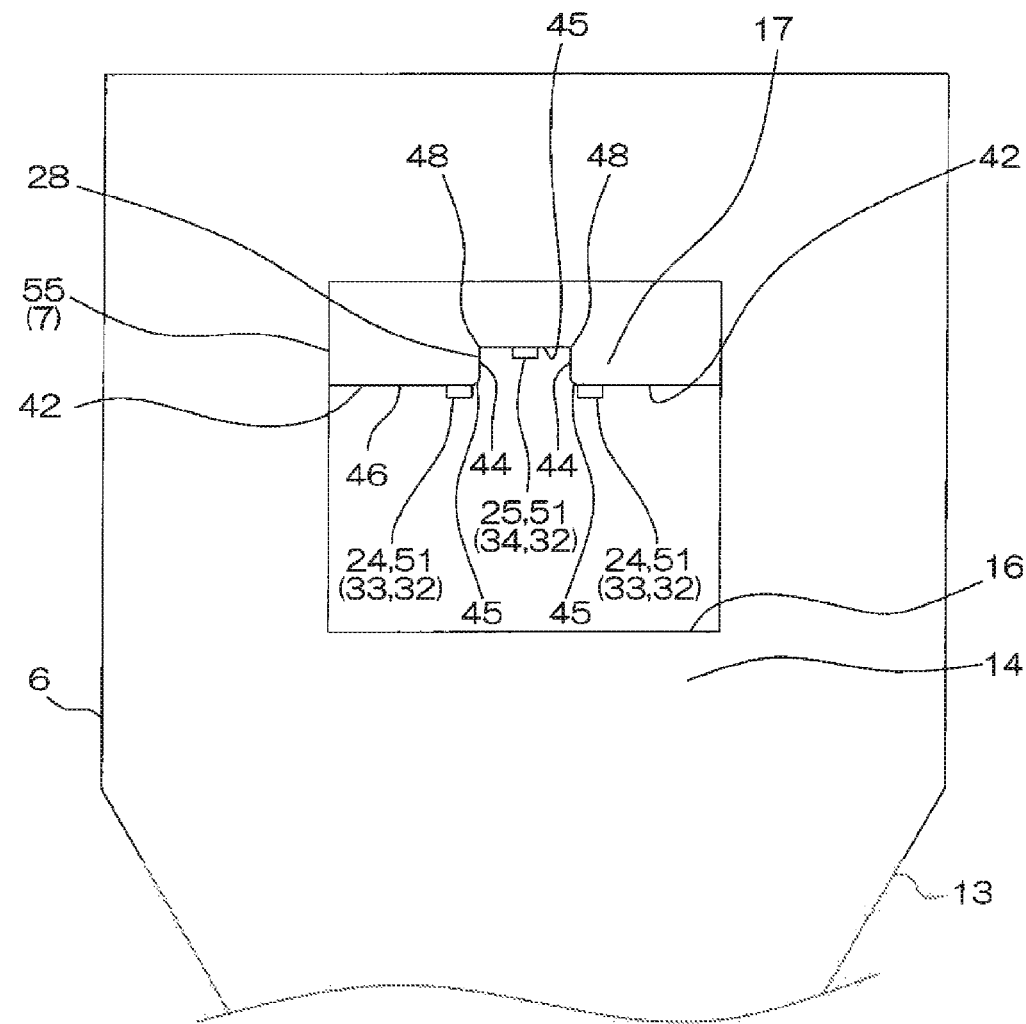
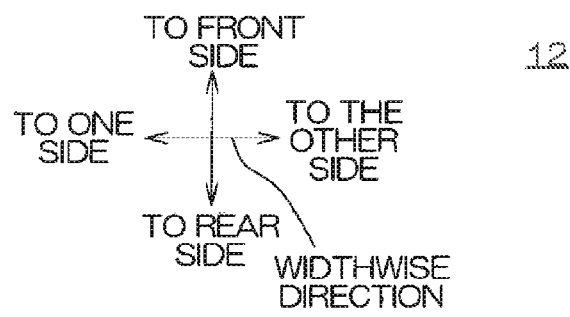

SUSPENSION BOARD WITH CIRCUIT

CROSS-REFERENCE TO RELATED APPLICATION

The present application claims the benefit of U.S. Provisional Application No. 61/738,010, filed on Dec. 17, 2012, and also claims priority from the present application claims priority from Japanese Patent Application No. 2012-264216 filed on Dec. 3, 2012, the content of which is herein incorporated by reference into this application.

BACKGROUND OF THE INVENTION

1. Field of the Invention

The present invention relates to a suspension board with circuit, and particularly to a suspension board with circuit used in a hard disk drive.

2. Description of the Related Art

Conventionally, a suspension board with circuit has been proposed on which a light emitting element for improving a recording density in accordance with an optically assisted method.

For example, a thermally-assisted magnetic recording head has been proposed configured by mounting a light source unit including a unit board (main body), and a laser diode provided to protrude from the surface of the unit board (main body) on which a light source is placed on a slider (see, e.g., Japanese Unexamined Patent No. 2009-266365).

The thermally-assisted magnetic recording head described in Japanese Unexamined Patent No. 2009-266365 is mounted on a suspension board with circuit corresponding thereto so that a thermally assisted method is implemented.

SUMMARY OF THE INVENTION

In a conventional attempt, a receiving portion is provided in the suspension board with circuit to receive the light source unit.

However, when the receiving portion of the suspension board with circuit receives the light source unit, the problem is encountered that the protruding laser diode comes in contact with a peripheral member to give damage to such a member.

It is therefore an object of the present invention to provide a suspension board with circuit which effectively prevents damage and has excellent reliability.

A suspension board with circuit of the present invention is a suspension board with circuit for mounting thereon a slider/light source unit provided with a slider on which a magnetic head is mounted, and a light source device including a main body, and a light source provided to protrude from the main body. The suspension board with circuit includes a receiving portion formed therein to be capable of receiving the light source, and a guide surface for guiding the light source to the receiving portion when the slider/light source unit is mounted.

In the suspension board with circuit, when the slider/light source unit is mounted, the light source device can be guided to the receiving portion using the guide surface. This allows the receiving portion to smoothly receive the light source to be able to effectively prevent a peripheral member from coming into contact with the light source and being damaged thereby. As a result, the suspension board with circuit on which the slider/light source unit is mounted has excellent reliability.

In the suspension board with circuit of the present invention, it is preferable that the guide surface is a curved surface and/or an inclined surface inclined with respect to a direction in which the light source protrudes which is configured to guide the slider/light source unit to a position at which the slider/light source unit is to be mounted.

In the suspension board with circuit, the slider/light source unit can be reliably guided to the position at which the slider/light source unit is to be mounted using the curved surface and/or inclined surface.

It is preferable that the suspension board with circuit of the present invention further includes a metal supporting board, and an insulating layer laminated on one side of the metal supporting board in a thickness direction thereof and that the receiving portion is formed in the insulating layer.

In the suspension board with circuit, the receiving portion is formed in the insulating layer. This allows the light source to be more flexibly guided to and received in the light receiving portion than in the case where the receiving portion is formed in the metal supporting board.

It is preferable that the suspension board with circuit of the present invention further includes light-source-device-side terminals each laminated on one side or the other side of the insulating layer in the thickness direction and connected to the light source device and that the light-source-device-side terminals include a main-body-side terminal connected to the main body, and a light-source-side terminal connected to the light source and disposed downstream of the main-body-side terminal in the direction in which the light source protrudes.

In the suspension board with circuit, the light-source-device-side terminals include the main-body-side terminal and the light-source-side terminal disposed downstream of the main-body-side terminal in the direction in which the light source protrudes. As a result, the main-body-side terminal and the light-source-side terminal allow the slider/light source unit to be more reliably positioned with respect to the position at which the slider/light source unit is to be mounted in the direction in which the light source protrudes.

BRIEF DESCRIPTION OF THE DRAWINGS

FIG. 3 shows an enlarged bottom view of the mounting portion of the suspension board with circuit shown in FIG. 1;

FIG. 4 shows an enlarged perspective view of the terminal formation region of the suspension board with circuit shown in FIG. 1;

FIG. 5 shows an enlarged plan view of the mounting portion when a slider/power source unit is mounted on the suspension board with circuit shown in FIG. 1;

FIG. 7 is an enlarged cross-sectional view of the terminal formation region shown in FIG. 5 along the widthwise direction thereof, FIG. 7(a) showing an enlarged cross-sectional view along the line D-D, and FIG. 7(b) showing an enlarged cross-sectional view along the line E-E;

FIG. 9 is an enlarged plan view of the terminal formation region in a modification of the first embodiment, FIG. 9(a) showing a form in which two front corner portions are each formed in a curved shape, FIG. 9(b) showing a form in which two side end surfaces are each formed in an inclined surface, FIG. 9(c) showing a form in which one of the side end surfaces is formed in an inclined surface, FIG. 9(d) showing a form in which a receiving portion is formed only on one widthwise side in the terminal formation region, and FIG. 9(e) showing a form in which the receiving portion is formed in one widthwise end portion of the terminal formation region;

FIG. 11 shows an enlarged bottom view of the mounting portion of the suspension board with circuit in the second embodiment of the present invention;

FIG. 13 shows an enlarged plan view of the mounting portion of a suspension board with circuit in a third embodiment of the present invention;

FIG. 14 shows an enlarged bottom view of the mounting portion of the suspension board with circuit in the third embodiment of the present invention;

DETAILED DESCRIPTION OF THE INVENTION

<First Embodiment>

In FIGS. 1, 2, 4, and 5, an insulating cover layer 9 described later is omitted to clearly show the relative positioning of a metal supporting board 6, an insulating base layer 7, and a conductive pattern 8. Also, in FIG. 9, the insulating cover layer 9 and the conductive pattern 8 each described later are omitted to clearly show the relative positioning of the metal supporting board 6 and the insulating base layer 7 each described later.

Figure 1:
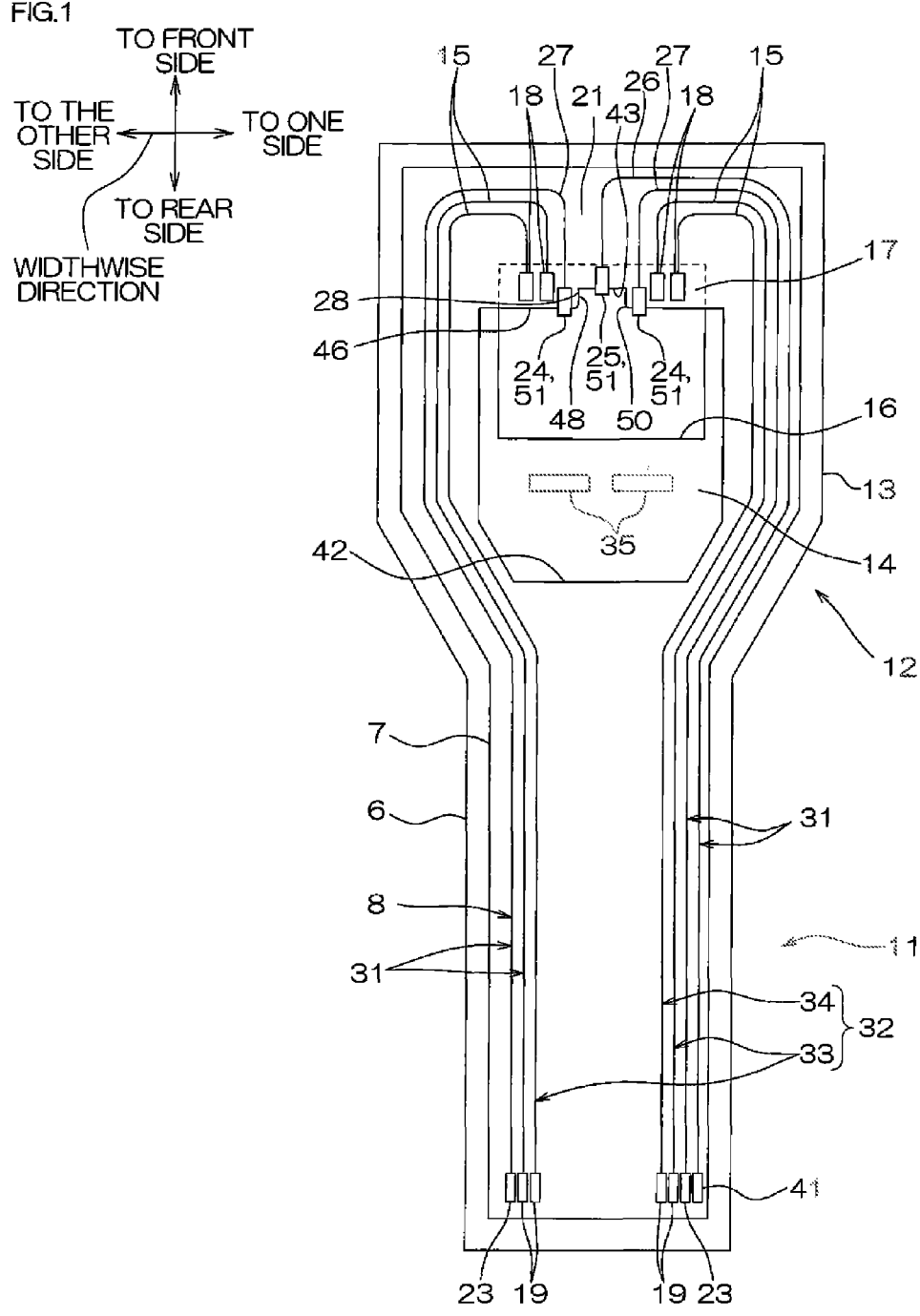
FIG. 1 shows a plan view of a suspension board with circuit in a first embodiment of the present invention.
Figure 6A:
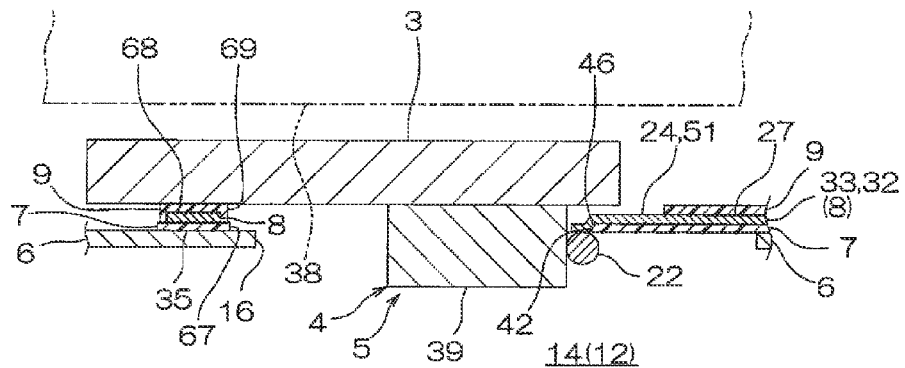
FIG. 6 is an enlarged cross-sectional view of the terminal formation region shown in FIG. 5 along the front-rear direction thereof, FIG. 6(a) showing an enlarged cross-sectional view along the line A-A, FIG. 6(b) showing an enlarged cross-sectional view along the line B-B, and FIG. 6(c) showing an enlarged cross-sectional view along the line C-C.
Figure 6B:
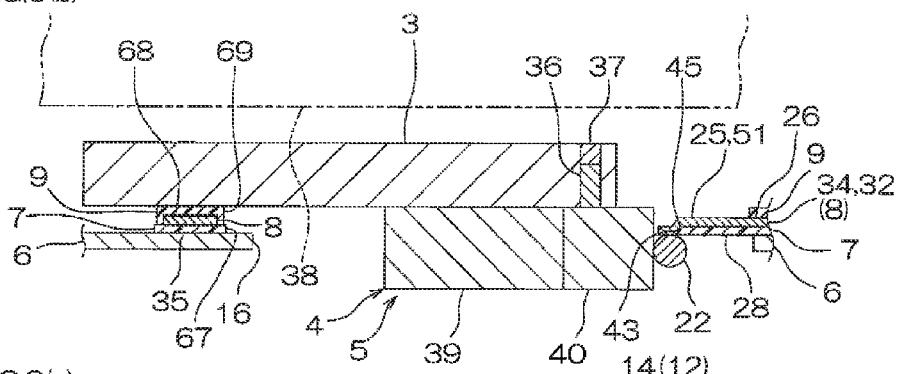
Figure 6C:
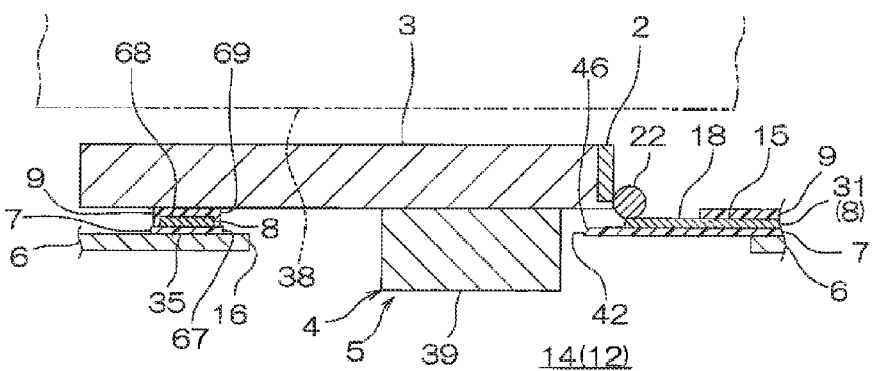

In FIGS. 1 and 6, the suspension board with circuit 1 is used in a hard disk drive using an optically assisted method with a slider/light source unit 5 (see FIG. 6(c)) provided with a slider 3 (see FIG. 6(c)) for mounting thereon a magnetic head 2 (see FIG. 6(c)), and a light source 40 (see FIG. 6(b)) being mounted thereon.

In the suspension board with circuit 1, as shown in FIG. 1, the conductive pattern 8 is supported on the metal supporting board 6.

The metal supporting board 6 is formed in a flat belt shape extending in a longitudinal direction and integrally includes a wiring portion 11 located on one side (hereinafter referred to as the rear side) in the longitudinal direction, and a mounting portion 12 located on the other side (hereinafter referred to as the front side) of the wiring portion 11 in the longitudinal direction.

The wiring portion 11 is formed in a generally rectangular shape in plan view extending in a front-rear direction. The wiring portion 11 is formed as a region having a lower surface thereof which is mounted and supported on a load beam (not shown).

The mounting portion 12 is formed as a region having a lower surface thereof which is exposed from the load beam without being mounted thereon when the wiring portion 11 is mounted on the load beam. Specifically, the mounting portion 12 is formed as the region of the suspension board with circuit 1 on which the slider/light source unit 5 (see FIG. 5) is mounted. More specifically, the mounting portion 12 is formed continuously from the front end of the wiring portion 11 into a generally rectangular shape in plan view protruding outwardly from the wiring portion 11 on both sides thereof in a widthwise direction (direction perpendicular to the front-rear direction).

The mounting portion 12 is partitioned into an outrigger portion 13 which protrudes outwardly from the wiring portion 11 on both widthwise sides thereof when projected in the front-rear direction, a mounting region 14 formed internally of the outrigger portion 13, and a wire turn-back portion 21 formed on the front side of each of the outrigger portion 13 and the mounting region 14.

Figure 2:
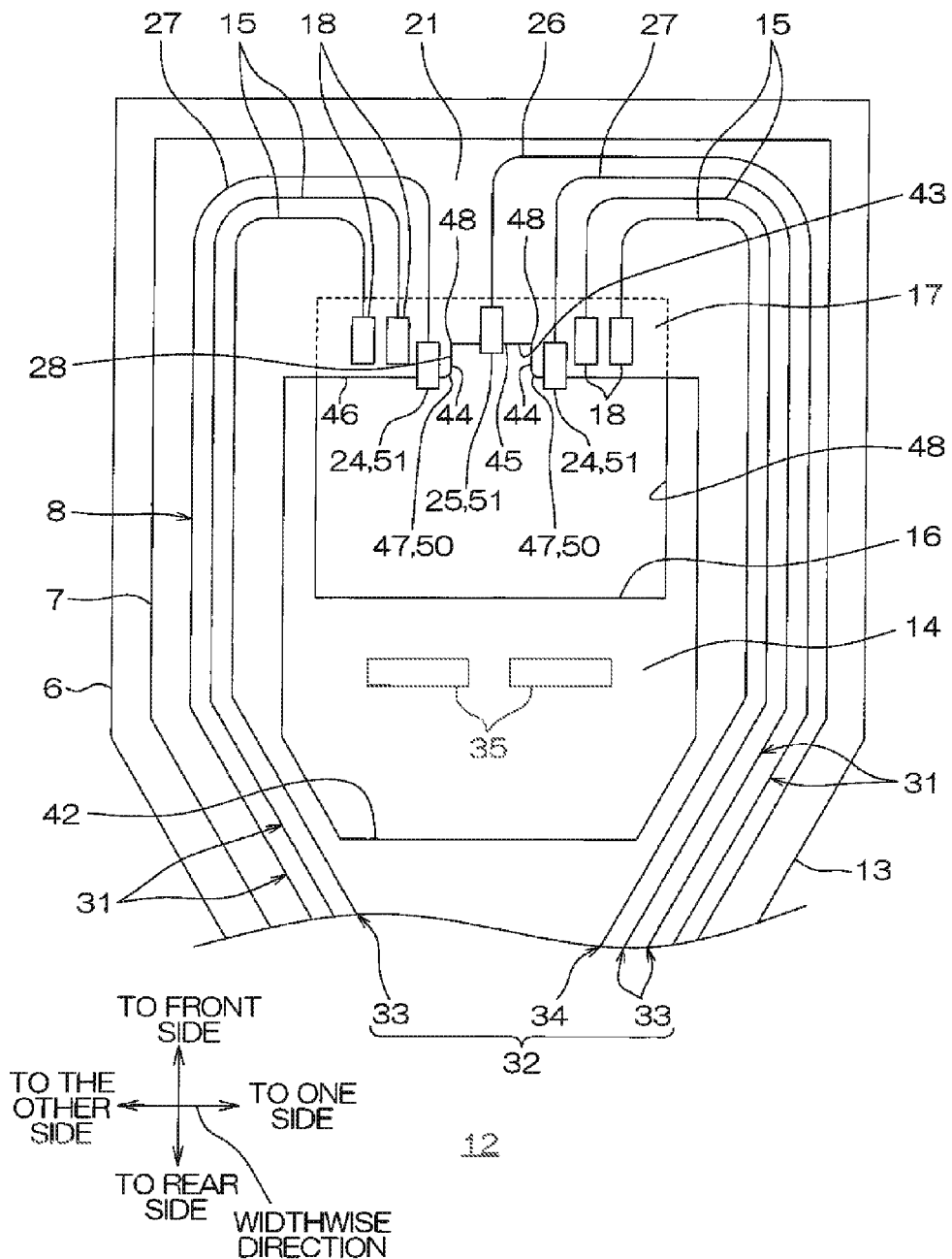
FIG. 2 shows an enlarged plan view of the mounting portion of the suspension board with circuit shown in FIG. 1.

As shown in FIG. 2, the outrigger portion 13 is the region of the mounting portion 12 having a generally rectangular shape in plan view extending in the front-rear direction and provided with head signal wires 15, main body signal wires 27, and a light source wire 26 (described later).

The mounting region 14 is a region located at the middle of the mounting portion 12 in each of the widthwise direction and the front-rear direction and having a generally rectangular shape in plan view. In the middle of the mounting portion 14 in the front-rear direction, a support opening 16 is formed.

The support opening 16 is formed in a generally rectangular shape in plan view so as to extend through the metal supporting board 6 in the thickness direction.

In the mounting region 14, a terminal formation region 17 is defined on the front side of the support opening 16.

The terminal formation region 17 is a region having a generally rectangular shape extending along the widthwise direction in plan view and formed with head-side terminals 18, main-body-side terminals 24 (described later), and a light-source-side terminal 25.

As shown in FIG. 1, the conductive pattern 8 includes a first conductive pattern 31 and a second conductive pattern 32.

The first conductive pattern 31 integrally includes the head-side terminals 18, external terminals 19, and the head-side signal wires 15 for connecting the head-side terminals 18 and the external terminals 19.

The head signal wires 15 are differential signal wires. Over the wiring portion 11 and the mounting portions 12, the plurality of (four) head signal wires 15 are provided along the front-rear direction and arranged in parallel to be spaced apart from each other in the widthwise direction.

As shown in FIG. 2, in the mounting portion 12, the individual head signal wires 15 are placed to extend from the front end of the outrigger portion 13, reach the both widthwise outer portions of the wire turn-back portion 21, and extend widthwise inwardly in the wire turn-back portion 21. Subsequently, the individual head signal wires 15 are further turned back rearwardly to extend rearwardly from the wire turn-back portion 21 and reach the front end portions of the head-side terminals 18 in the terminal formation region 17.

As shown in FIG. 1, the external terminals 19 are disposed in the rear end portion of the wiring portion 11. The plurality of (four) external terminals 19 are provided such that the respective rear end portions of the individual head signal wires 15 are connected thereto. Also, the external terminals 19 are arranged to be widthwise spaced apart from each other. To the external terminals 19, an external circuit board (not shown) such as a read/write board not shown is to be connected.

The head-side terminals 18 are disposed in the terminal formation region 17 of the mounting portion 12. The plurality of (four) head-side terminals 18 are provided such that the respective front end portions of the individual head signal wires 15 are connected thereto. More specifically, the individual head-side terminals 18 are arranged to be widthwise spaced apart from each other. Each of the head-side terminals 18 is formed in a generally rectangular shape in plan view extending in the front-rear direction and wider than each of the head signal wires 15.

As shown in FIG. 6(c), to the upper surface of each of the head-side terminals 18, the magnetic head 2 is to be electrically connected via a solder ball 22.

In the first conductive pattern 31, as shown in FIGS. 1 and 6(c), a write signal transmitted from the external circuit board (not shown) such as the read/write board is input to the magnetic head 2 via the external terminals 19, the head signal wires 15, and the head-side terminals 18, while a read signal read with the magnetic head 2 is input to the external circuit board (not shown) via the head-side terminals 18, the head signal wires 15, and the external terminals 19.

As shown in FIG. 1, the second conductive pattern 32 includes main-body-side patterns 33 and a light-source-side pattern 34 which are arranged to be spaced apart from each other.

Each of the main-body-side patterns 33 includes a first supply-side terminal 23, the main-body-side terminal 24, and the main body signal wire 27 for connecting the first supply-side terminal 23 and the main-body-side terminal 24.

The main body signal wires 27 are provided as two wires, disposed in the wiring portion 11 to be spaced apart from the head signal wires 15, and formed to extend in the front-rear direction. Specifically, each of the main body signal wires 27 is placed widthwise externally of each of the widthwise innermost head signal wire 15 and the widthwise outermost head signal wire 15 to be spaced apart therefrom.

In the mounting portion 12, each of the main body signal wires 27 is placed externally of the outermost head signal wire 15 to be spaced apart therefrom. In the outrigger portion 13, each of the main body signal wires 27 is placed widthwise externally of the widthwise outermost head signal wire 15 to be spaced apart therefrom. In the wire turn-back portion 21, each of the main body signal wires 27 is placed to extend inwardly, be subsequently turned back rearwardly, extend rearwardly from the widthwise middle portion of the wire turn-back portion 21, and reach the front end portion of the main-body-side terminal 24 in the terminal formation region 17.

The first supply-side terminals 23 are provided as two terminals and disposed to be spaced apart from the external terminals 19 in facing relation.

As shown in FIG. 2, the main-body-side terminals 24 are disposed in the terminal formation region 17. Specifically, the main-body-side terminals 24 are disposed internally of the two widthwise inner head-side terminals 18 to be spaced apart therefrom.

Also, the two main-body-side terminals 24 are provided for the two main body signal wires 27. The two main-body-side terminals 24 are arranged to be widthwise spaced apart from each other.

Each of the main-body-side terminals 24 is formed in a generally rectangular shape in plan view extending in the front-rear direction and wider than each of the main body signal wires 27.

The main-body-side terminals 24 are disposed on the rear side of the head-side terminals 18 when projected in the widthwise direction. Specifically, the main-body-side terminals 24 are formed such that the front end portions thereof overlap the head-side terminal portions 18 and the rear end portions thereof do not overlap the head-side terminals 18 when projected in the widthwise direction.

As shown in FIG. 6(a), to the lower surface of each of the main-body-side terminals 24, a main body 39 (described later) of a light source device 4 is electrically connected via the solder ball 22.

As shown in FIGS. 1 and 6(a), in the main-body-side patterns 33, electrical energy supplied from the power source (not shown) is supplied to the main body 39 via the first supply-side terminals 23, the main body signal wires 27, and the main-body-side terminals 24 to operate the main body 39 under control.

As shown in FIG. 1, the light-source-side pattern 34 includes a second supply-side terminal 41, the light-source-side terminal 25, and the light source wire 26 for connecting the second supply-side terminal 41 and the light-source-side terminal 24.

The light source wire 26 is provided as one wire, disposed in the wiring portion 11 to be spaced apart from the main body signal wires 27, and formed to extend in the front-rear direction. Specifically, the light source wire 26 is placed on one widthwise side (outer side) of the head signal wires 15 on one widthwise side (outer side) to be spaced apart therefrom.

The light source wire 26 is provided as one wire. As shown in FIG. 2, in the mounting portion 12, the light source wire 26 is disposed on one widthwise side of the main body signal wire 27 on one widthwise side to be spaced apart therefrom. Also, in the outrigger portion 13, the light source wire 26 is disposed on one widthwise side of the main body signal wire 27 on one widthwise side to be spaced apart therefrom. In the wire turn-back portion 21, the light source wire 26 is placed to extend toward the other widthwise side (inwardly), be subsequently turned back rearwardly, extend rearwardly from the widthwise middle portion of the wire turn-back portion 21, and reach the front end portion of the light-source-side terminal 25 in the terminal formation region 17.

The second supply-side terminal 41 is disposed on one widthwise side of the first supply-side terminal 23 on one widthwise side to be spaced apart therefrom in facing relation.

The light-source-side terminal 25 is provided as one terminal and disposed in the terminal formation region 17. Specifically, the light-source-side terminal 25 is disposed internally of the two widthwise inner head-side terminals 18 to be spaced apart therefrom. More specifically, the light-source-side terminal 25 is disposed internally of the two main-body-side terminals 24 to be spaced apart therefrom.

As shown in FIG. 2, the light-source-side terminal 25 is formed in a generally rectangular shape in plan view extending in the front-rear direction and wider than the light source wire 26.

That is, the light-source-side terminal 25 is disposed on the front side of the head-side terminals 18 when projected in the widthwise direction. Specifically, the light-source-side terminal 25 is formed such that the rear end portion of the light-source-side terminal 25 overlaps the head-side terminals 18 and the front end portion of the light-source-side terminal 25 does not overlap the head-side terminals 18 when projected in the widthwise direction. Specifically, when projected in the widthwise direction, the front end edge of the light-source-side terminal 25 is located on the front side of the front end edges of the head-side terminals 18 and the rear end edge of the light-source-side terminal 25 is located on the front side of the rear end edges of the head-side terminals 18.

Also, the light-source-side terminal 25 is disposed on the front side of the main-body-side terminals 24 when projected in the widthwise direction. Specifically, the light-source-side terminal 25 is formed such that the rear end portion thereof overlaps the main-body-side terminals 24. More specifically, when projected in the widthwise direction, the rear end edge of the light-source-side terminal 25 is located on the front side of the rear end edges of the main-body-side terminals 24 and the front end edge of the light-source-side terminal 25 is located on the front side of the front end edges of the head-side terminals 18.

To the lower surface of the rear end portion of the light-source-side terminal 25, as shown in FIG. 6(b), the light source 40 (described later) of the light source device 4 is electrically connected via the solder ball 22.

As shown in FIGS. 6(a) and 6(b), the main-body-side terminals 24 and the light-source-side terminal 25 are each connected to the light source device 4 to cooperate to form light-source-device-side terminals 51.

Also, as shown in FIGS. 6 and 7, the suspension board with circuit 1 includes the metal supporting board 6, the insulating base layer 7 as an insulating layer formed on (one side in the thickness direction of) the meal supporting board 6, the conductive pattern 8 formed on (one one side in the thickness direction of) the insulating base layer 7, and the insulating cover layer 9 formed on the insulating base layer 7 so as to cover the conductive pattern 8.

The metal supporting board 6 is formed of a metal material (conductive material) such as, e.g., stainless steel, a 42-alloy, aluminum, a copper-beryllium alloy, or phosphor bronze. Preferably, the metal supporting board 6 is formed of stainless steel. The thickness of the metal supporting board 6 is in a range of, e.g., 10 to 50 µm, or preferably 15 to 25 µm.

As shown in FIG. 1, the insulating base layer 7 is disposed over the wiring portion 11 and the mounting portion 12 and formed to correspond to a portion formed with the conductive pattern 8. Specifically, as shown in FIGS. 1 and 2, the insulating base layer 7 is formed in a pattern exposing the peripheral end edge of the metal supporting board 6, the rear end edge and the both widthwise end edges of the support opening 16 (except for the front end edge thereof) in the mounting portion 12. The insulating base layer 7 is also formed in a pattern exposing the metal supporting board 6 in the mounting region 14 into a generally rectangular shape in plan view.

That is, in the insulating base layer 7, a base opening 42 is formed at a position corresponding to the mounting region 14.

The base opening 42 is formed in a generally rectangular shape in plan view extending through the insulating base layer 7 in the thickness direction. The base opening 42 is formed to partially overlap the support opening 16 and be communicated therewith when projected in the thickness direction. Specifically, the base opening 42 is formed to include the rear portion of the support opening 16. The base opening 42 also exposes the metal supporting board 6 on the rear side of the support opening 16.

The insulating base layer 7 is formed of an insulating material such as a synthetic resin such as, e.g., a polyimide resin, a polyamide imide resin, an acrylic resin, a polyether nitrile resin, a polyether sulfone resin, a polyethylene terephthalate resin, a polyethylene naphthalate resin, or a polyvinyl chloride resin. Preferably, the insulating base layer 7 is formed of a polyimide resin.

The thickness of the insulating base layer 7 is in a range of, e.g., 6 to 17 µm, or preferably 8 to 12 µm.

As shown in FIG. 1, the conductive pattern 8 is formed in a pattern including the first conductive pattern 31 and the second conductive pattern 32 described above. The conductive pattern 8 is formed of a conductive material such as, e.g., copper, nickel, gold, a solder, or an alloy thereof or the like. Preferably, the conductive pattern 8 is formed of copper.

The thickness of the conductive pattern 8 is in a range of, e.g., 3 to 50 µm, or preferably 5 to 20 µm. The width of each of the head signal wires 15, the main body signal wires 27, and the light source wire 26 is in a range of, e.g., 8 to 300 µm, or preferably 10 to 200 µm. The spaces between the individual head signal wires 15, between the individual main body signal wires 27, between the head signal wire 15 and the main body signal wire 27 which are adjacent to each other, and between the main body signal wire 27 and the light source wire 26 which are adjacent to each other are in a range of, e.g., 8 to 2000 µm, or preferably 10 to 1000 µm.

The width of each of the head-side terminals 18, the external terminals 19, the main-body-side terminals 24, the first supply-side terminals 23, the light-source-side terminal 25, and the second supply-side terminal 41 is in a range of, e.g., 20 to 1000 µm, or preferably 30 to 800 µm. The spaces between the individual head-side terminals 18, between the individual external terminals 19, between the head-side terminal 18 and the main-body-side terminal 24 which are adjacent to each other on a projection surface on which they are projected in the front-rear direction, between the main-body-side terminal 24 and the light-source-side terminal 25 which are adjacent to each other on a projection surface on which they are projected in the front-rear direction, between the external terminal 19 and the first supply-side terminal 23 which are adjacent to each other, and between the first supply-side terminal 23 and the second supply-side terminal 41 which are adjacent to each other are in a range of, e.g., 20 to 1000 µm, or preferably 30 to 800 µm.

The insulating cover layer 9 is disposed extensively over the wiring portion 11 and the mounting portion 12. As shown in FIGS. 6 and 7, the insulating cover layer 9 is disposed to correspond to the portion formed with the conductive pattern 8. Specifically, the insulating cover layer 9 is formed in a pattern covering the head signal wires 15, the main body signal wires 27, and the light source wire 26 and exposing the head-side terminals 18, the external terminals 19 (see FIG. 1), the main-body-side terminals 24, the first supply-side terminals 23 (see FIG. 1), the light-source-side terminal 25, and the second supply-side terminal 41 (see FIG. 1).

The insulating cover layer 9 is formed of the same insulating material as the insulating material of the insulating base layer 7 shown above. The thickness of the insulating cover layer 9 is in a range of, e.g., 1 to 40 μm, or preferably 1 to 10 μm.

Next, a detailed description is given of the terminal formation region 17 and the peripheral portion thereof.

As shown in FIG. 3, the terminal formation region 17 is a region where the insulating base layer 7 exposed from the support opening 16 of the metal supporting board 6 is provided in bottom view.

In the terminal formation region 17, the insulating base layer 7 is formed to extend rearwardly in a belt shape from the front end edge of the support opening 16 and face the inside of the support opening 16.

Of the insulating base layer 7, rear end surfaces (base end surfaces) 46 in the terminal formation region 17 are formed with a receiving portion 28 which is a cutaway portion formed from the widthwise middle toward the front side.

The receiving portion 28 defines a protruding opening 43 protruding frontwardly from the front end portion of the base opening 42 having a generally rectangular shape in plan view into a rectangular shape in plan view.

In the terminal formation region 17, the receiving portion 28 is provided in the widthwise middle portion and formed in a shape which allows the receiving portion 28 to receive the light source 40 (see FIG. 5) described later. Specifically, the receiving portion 28 includes two side end surfaces 44 disposed to face each other in the widthwise direction, and a front end surface 45 connected to the front end portions of the two side end surfaces 44. In bottom view, the receiving portion 28 includes two corner portions (rear corner portions) 47 respectively formed by the two base end surfaces 46 on both widthwise sides of the protruding opening 43 and the two side end surfaces 44, and two corner portions (front corner portions) 48 respectively formed by the two side end surfaces 44 and the front end surface 45.

In the receiving portions 28, as shown in FIGS. 3 and 4, the two rear corner portions 47 are formed as guide surfaces 50 each chamfered into a curved shape. As shown in FIG. 4, the guide surfaces 50 are formed as curved surfaces configured to guide the light source 40 shown by the broken line in FIG. 5 to the receiving portion 28 when the slider/light source unit 5 described later is mounted on the mounting region 14.

The dimensions of the terminal formation region 17 are selectively and appropriately determined. As shown in FIG. 3, the receiving portion 28 is formed such that the width thereof, i.e., the space (width) between the side end surfaces 44 facing each other is larger than the width of the light source 40 (see FIG. 5) described later. The width of the receiving portion 28 is set to a value of, e.g., not less than 120%, or preferably not less than 150% of the width of the light source 40 and, e.g., not more than 500%, or preferably not more than 250% thereof. The receiving portion 28 is also formed such that the width thereof is larger than the width of the light source 40 by a width of, e.g., not less than 0.020 mm, or preferably not less than 0.050 mm and, e.g., not more than 10 mm, or preferably not more than 1 mm. Specifically, the width of the receiving portion 28 is set to a value in a range of, e.g., not less than 0.050 mm, or preferably not less than 0.1 mm and, e.g., not more than 10 mm, or preferably not more than 5 mm.

The receiving portion 28 is formed such that the length thereof in the front-rear direction, e.g., the distance between each of the base end surfaces 46 and the front end surface 45 when the receiving portion 28 is projected in the widthwise direction is, e.g., not less than 20%, or preferably not less than 50% of the length of the light source 40 in the front-rear direction and, e.g., not more than 500%, or preferably not more than 250% thereof. Specifically, the length of the receiving portion 28 in the front-rear direction is in a range of, e.g., not less than 30 μm, or preferably not less than 40 μm and, e.g., not more than 500 μm, or preferably not more than 300 μm.

In plan view, the radius of curvature of each of the guide surfaces 50 is in a range of, e.g., not less than 0.010 mm, or preferably not less than 0.020 mm and, e.g., not more than 0.500 mm, or preferably not more than 0.250 mm.

As shown in FIG. 2, the suspension board with circuit 1 further includes pedestals 35.

The pedestals 35 are provided in the rear portion of the mounting region 14. More specifically, the pedestals 35 are disposed on the rear side of the support opening 16 to be spaced apart from each other. The plurality of (two) pedestals 35 are provided to be widthwise spaced apart from each other. Each of the pedestals 35 is formed in a generally rectangular shape in plan view extending in the widthwise direction. As shown in FIG. 6, the pedestal 35 includes a pedestal base layer 67 formed of the same insulating material as that of the insulating base layer 7, a pedestal conductive layer 68 formed of the same conductive material as that of the conductive pattern 8, and a pedestal cover layer 69 formed of the same insulating material as that of the insulating cover layer 9.

Next, a method of producing the first suspension board with circuit 1 is described with reference to FIG. 8.

Figure 8A:
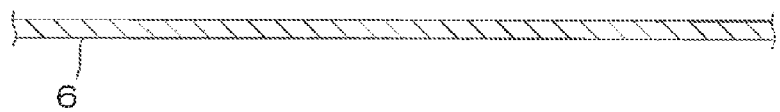
FIG. 8 is a process view illustrating a method of producing the suspension board with circuit shown in FIG. 6(b), FIG. 8(a) showing the step of preparing a metal supporting board, FIG. 8(b) showing the step of forming an insulating base layer and a pedestal base layer, FIG. 8(c) showing the step of forming a conductive pattern and a pedestal conductive layer, FIG. 8(d) showing the step of forming an insulating cover layer and a pedestal cover layer, and FIG. 8(e) showing the step of forming a support opening.

As shown in FIG. 8(a), in the method, the metal supporting board 6 having a flat plate shape is prepared first.

Figure 8B:
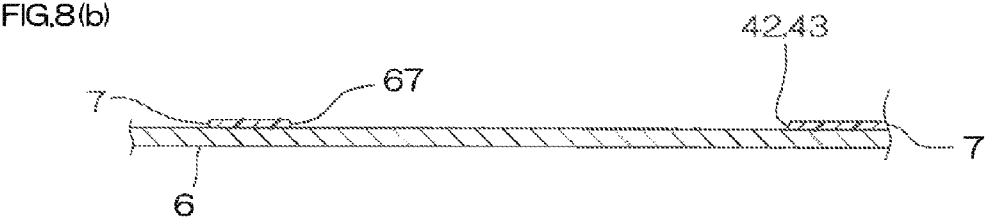

Next, in the method, as shown in FIG. 8(b), the insulating base layer 7 is formed on the upper surface of the metal supporting board 6 into the foregoing pattern formed with the base opening 42 including the protruding opening 43.

Specifically, to the entire upper surface of the metal supporting board 6, a varnish of a photosensitive insulating material is applied, dried, exposed to light, developed, and cured by heating to form the insulating base layer 7 in the foregoing pattern.

Simultaneously with the formation of the insulating base layer 7, the pedestal base layer 67 is formed in the foregoing pattern on the upper surface of the metal supporting board 6.

Figure 8C:
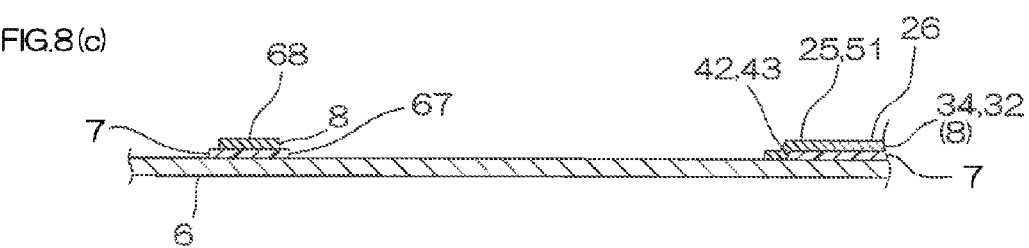

Next, in the method, as shown in FIG. 8(c), the conductive pattern 8 is formed over the metal supporting board 6 and the insulating base layer 7 by an additive method or a subtractive method.

Figure 8D:
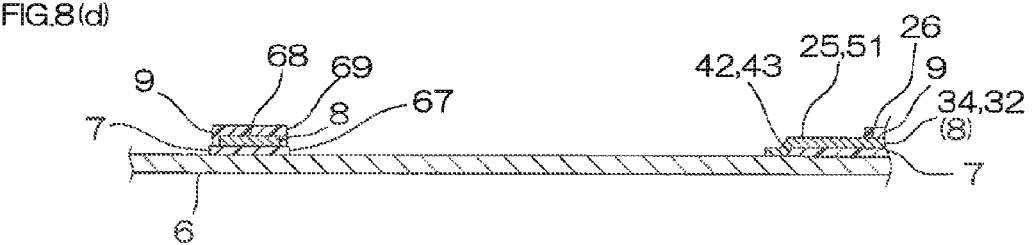

Next, as shown in FIG. 8(d), the insulating cover layer 9 is formed in the foregoing pattern on the insulating base layer 7.

Specifically, to the entire upper surface of the insulating base layer 7 including the conductive pattern 8, a varnish of a photosensitive insulating material is applied, dried, exposed to light, developed, and then cured by heating to form the insulating cover layer 9 in the foregoing pattern.

Figure 8E:
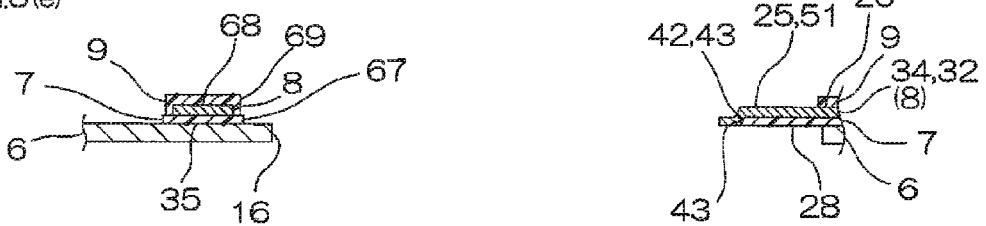

Next, as shown in FIG. 8(e), the support opening 16 is formed in the metal supporting board 6.

The support opening 16 is formed by, e.g., an etching method such as dry etching or wet etching, drilling perforation, laser processing, or the like. Preferably, the support opening 16 is formed by wet etching.

Thus, the lower surface of the insulating base layer 7 in the terminal formation region 17 is exposed from the support opening 16, while the lower surface of each of the rear end portion of the light-source-side terminal 25 and the rear end portions (see FIG. 6(a)) of the main-body-side terminals 24 is exposed from the base opening 42.

The rear end portion of the light-source-side terminal 25 and the rear end portions (see FIG. 6(a)) of the main-body-side terminals 24 are each formed to protrude rearwardly from the front end edge of each of the protruding opening 43 and the base opening 42. Specifically, each of the rear end portions thereof extends downwardly along the front end surface of each of the protruding opening 43 and the base opening 42 and then rearwardly protrudes. The lower surfaces of such projecting portions are formed flush with the lower surface of the insulating base layer 7.

Simultaneously with or after the formation of the support opening 16, the metal supporting board 6 is trimmed.

In this manner, the suspension board with circuit 1 is obtained.

On the suspension board with circuit 1, as shown in FIG. 5, the slider/light source unit 5 is mounted.

The slider/light source unit 5 integrally includes the slider 3, and the light source device 4. As shown in FIG. 6, the slider 3 is supported on the metal supporting board 6 in the mounting region 14 via the pedestals 35 so as to be floated over a magnetic disk 38 (see the imaginary line) in a hard disk drive with a minute gap being held therebetween, while travelling relative to the magnetic disk 38. The slider 3 has a generally rectangular shape in lateral cross section. As shown in FIG. 5, the slider 3 is formed in a generally rectangular shape in plan view so as to overlap the rear end portion of the terminal formation region 17, the widthwise middle portion of the support opening 16, the widthwise middle portion of the base opening 42, and the portion of the mounting region 14 located on the rear side of the support opening 16 when projected in the thickness direction.

As shown in FIGS. 5 and 6(c), the front end portion of the slider 3 is located to be proximate to the head-side terminals 18. Specifically, the front end portion of the slider 3 is located to be spaced apart from the rear end portion of each of the head-side terminals 18 via a minute gap when projected in the thickness direction. On the other hand, the rear end portion of the slider 3 is supported on the pedestals 35. That is, the rear end portion of the slider 3 is located over the metal supporting board 6 such that the pedestals 35 are interposed therebetween.

On the slider 3, as shown in FIGS. 6(b) and 6(c), the magnetic head 2, an optical waveguide 36, and a near-field light generating member 37 are mounted.

As shown in FIG. 6(c), the magnetic head 2 is formed in the upper part of the front end portion of the slider 3 and provided to face the magnetic head 38 shown by the imaginary line to be capable of reading and writing to the magnetic disk 38.

As shown in FIG. 6(b), the optical waveguide 36 is provided in the front end portion of the slider 3 and on the rear side of the magnetic head 2 (see FIG. 6(c)) and formed to extend along the thickness direction. The optical waveguide 36 is located to be included in the rear portion of the light source 40 in plan view.

On the upper end portion of the optical waveguide 36, the near-field light generating member 37 is provided. The optical waveguide 36 causes light emitted from the light source device 4 to be incident on the near-field light generating member 37.

The near-field light generating member 37 is provided over the optical waveguide 36. Note that the near-field light generating member 37 is formed of a metal scatterer, an opening, or the like. For example, a known near-field light generating device described in Japanese Unexamined Patent No. 2007-280572, 2007-052918, 2007-207349, 2008-130106, or the like is used.

The near-field light generating member 37 generates near-field light from the light incident thereon from the optical waveguide 36 and irradiates the magnetic disk 38 with the near-field light to heat a minute region in the magnetic disk 38.

As shown in FIG. 5, the light source device 4 is formed in a generally T-shaped shape in plan view and integrally includes the main body 39, and the light source 40.

The main body 39 is a member equipped with a function related to a thermally assisted method (or optically assisted method). Specifically, the main body 39 is a light source unit which is a member produced/tested in a process different from a process in which the slider 3 is produced/tested and then fixed to the slider 3. The main body 39 is a member which is fixed as the light source unit to the slider 3 to eliminate the need to extensively place an optical fiber, a lens, a mirror, or the like for guiding light over a long distance and reduce the degradation of the efficiency of light propagation. The main body 39 as the light source unit is fixed to the surface of the slider 3 opposite to the magnetic disk 38 (recording medium) to be able to suppress an adverse effect exerted by heat generated from the light source 40 on magnetic recording or the like. As shown in FIGS. 6(a) to 6(c), the main body 39 is attached to the lower surface of the slider 3 and formed in a generally rectangular box shape in plan view which is elongated in the widthwise direction. Specifically, the main body 39 is disposed so as to be included in the slider 3 when projected in the thickness direction. More specifically, as shown in FIG. 6(b), the main body 39 is disposed on the lower surface of the front portion of the slider 3.

As shown in FIG. 5, the main body 39 is disposed so as to be included in the base opening 42 when projected in the thickness direction. Specifically, the main body 39 is disposed in the front portion of the base opening 42 when projected in the thickness direction. Also, the front end surface of the main body 39 is located on the rear side of the base end surfaces 46 to be spaced apart from and substantially parallel with the base end surfaces 46 when projected in the thickness direction.

The light source 40 is a light source for causing light to be incident on the optical waveguide 36. For example, the light source 40 converts electrical energy to optical energy and emits high-energy light from an outlet. Examples of the light source 40 include a laser diode and the like.

The light source 40 is provided to frontwardly protrude from the main body 39. Specifically, the light source 40 is formed in a generally rectangular shape in plan view protruding frontwardly from the widthwise middle portion of the front end surface of the main body 39.

Also, the front portion of the light source 40 is formed to protrude from a projected area of the slider 3 when projected in the thickness direction. On the other hand, the rear portion of the light source 40 is attached to the lower surface of the slider 3 so as to be included in the front end portion of the slider 3 when projected in the thickness direction.

The light source 40 is received in the receiving portion 28 and placed in the protruding opening 43. That is, the peripheral end surface of the light source 40 is located to be spaced apart from the inner side surfaces of the receiving portion 28. Specifically, the front end surface of the light source 40 is located on the rear side of the front end surface 45 of the receiving portion 28 to be spaced apart therefrom, and the both widthwise end surfaces of the light source 40 are located widthwise internally of the two side end surfaces 44 of the receiving portion 28 to be spaced apart therefrom. In other words, the light source 40 is disposed so as to be included in the front end surface 45 of the receiving portion 28 when projected in the front-rear direction, and the front end portion of the light source 40 and the middle portion thereof in the front-rear direction are located so as to be included in the side end surfaces 44 when projected in the widthwise direction.

When the slider/light source unit 5 is mounted on the suspension board with circuit 1, the slider/light source unit 5 in which the light source unit 4 is placed on the slider 3 is prepared. Subsequently, as shown by the imaginary line of FIG. 7(b), the slider/light source unit 5 is positioned over the suspension board with circuit 1. Subsequently, as shown by the arrow in FIG. 7(b), the slider/light source unit 5 is placed (moved down) slightly rearwardly of the position on the suspension board with circuit 1 at which the slider/light source unit 5 is to be mounted. At the same time, as shown in FIG. 6(b), the pedestals 35 are caused to support the slider 3. Also, as shown in FIG. 5, at the same time when the slider 3 is supported on the pedestals 35, the main body 39 is contained in the base opening 42.

Specifically, the main body 39 is caused to be contained first in the rear portion of the base opening 42 and/or in the middle portion thereof in the front-rear direction. Thus, the light source 40 is placed rearwardly of the receiving portion 28.

Subsequently, the light source device 4 is moved (slid) frontwardly to move the main body 39 to the front portion of the base opening 42 and also insert the light source 40 into the protruding opening 43 of the receiving portion 28. That is, the receiving portion 28 is caused to receive the light source 40.

At this time, even though the widthwise position of the light source 40 is shifted to one widthwise side or to the other widthwise side with respect to the position at which the light source 40 is to be mounted corresponding to the position at which the slider/light source unit 5 is mounted when the light source 40 is projected in the front-rear direction, using the guide surfaces 50 each having the curved shape in plan view, the light source 40 can be guided to the receiving portion 28. Specifically, even though the both end portions (both corner portions) of the front end surface of the light source 40 are shifted in the widthwise direction with respect to the position at which the light source 40 is to be mounted when the light source 40 is projected in the front-rear direction, the both end portions are flexibly guided by the guide surfaces 50 into the protruding opening 43 of the receiving portion 28 as if being sucked in. Subsequently, with the widthwise end surface (one of the both widthwise end surfaces) of the light source 40 being in contact with one of the guide surfaces 50, the front end surface of the light source 40 frontwardly moves to be proximate to the front end surface 45. In this manner, the light source 40 is guided to a position at which the light source 40 is intended to be mounted and received in the receiving portion 28.

Note that the position on the suspension board with circuit 1 at which the slider/light source unit 5 is to be mounted is set such that the length (distance) L between the front end surface of the slider 3 and the rear end portion of each of the main-body-side terminals 24 in the front-rear direction is in a range of, e.g., not less than 0.010 mm, or preferably not less than 0.015 mm and, e.g., not more than 0.300 mm, or preferably not more than 0.150 mm when the slider/light source unit 5 and the suspension board with circuit 1 are projected in the thickness direction.

In the suspension board with circuit 1, when the slider/light source unit 5 is mounted thereon, using the guide surfaces 50, the light source device 40 can be guided to the receiving portion 28. Therefore, it is possible to allow the receiving portion 28 to smoothly receive the light source 40 and thus effectively prevent a member around the receiving portion 28 such as, e.g., the head signal wires 15 from coming in contact with the light source 40 and being damaged thereby. As a result, the suspension board with circuit 1 on which the slider/light source unit 5 is mounted has excellent reliability.

Also, in the suspension board with circuit 1, using the curved guide surfaces 50, the slider/light source unit 5 can be reliably guided to the position at which the slider/light source unit 5 is to be mounted.

Also, in the suspension board with circuit 1, the receiving portion 28 is formed in the insulating base layer 7. This allows the light source 40 to be more flexibly guided to the receiving portion 28 and received therein than in the case where the receiving portion 28 is formed in the metal supporting board 6, though not shown.

Also, in the suspension board with circuit 1, the light-source-device-side terminals 51 include the main-body-side terminals 24, and the light-source-side terminal 25 disposed downstream of the main-body-side terminals 24 in the direction in which the light source 40 protrudes when projected in the widthwise direction, i.e., on the front side thereof. Therefore, using the main-body-side terminals 24 and the light-source-side terminal 25 which are located to be shifted in the front-rear direction when projected in the widthwise direction, the slider/light source unit 5 can be more reliably positioned with respect to the position at which the slider/light source unit 5 is to be mounted in the front-rear direction.

<Modification>

In the first embodiment shown in FIG. 2, each of the two corner portions 48 is formed in a right-angled shape in plan view. However, as shown in, e.g., FIG. 9(a), each of the corner portions 48 can also be formed into a chamfered curved shape in plan view.

In a first embodiment shown in FIG. 2, the two side end surfaces 44 are formed in a parallel shape along the front-rear direction. However, as shown in, e.g., FIG. 9(b), each of the side end surfaces 44 can also be formed into an inclined shape which is inclined with respect to the front-rear direction.

The two side end surfaces 44 are formed in a tapered shape in plan view in which the distance between the two end surfaces 44 facing each other gradually decreases with approach to the front side. In plan view, an acute angle α formed between each of the side end surfaces 44 and the base end surface 46 is in a range of, e.g., not less than 30 degrees, or preferably not less than 45 degrees and, e.g., less than 90 degrees, or preferably not more than 85 degrees.

The two side end surfaces 44 and the two front corner portions 48 form the guide surfaces 50.

Alternatively, as shown in FIG. 9(c), only the side end surface 44 on one widthwise side can also be formed into an inclined surface.

In the first embodiment shown in FIG. 2, the receiving portion 28 is formed in the widthwise middle portion of the terminal formation region 17. However, as shown in FIG. 9(d), the receiving portion 28 can also be formed (eccentrically) only on one widthwise side in the terminal formation region 17.

Alternatively, as shown in FIG. 9(e), the receiving portion 28 can also be formed in the one widthwise end portion of the terminal formation region 17. In this case, the only one guide surface 50 is formed. Specifically, in FIG. 9(e), the receiving portion 28 is formed in the other widthwise end portion of the terminal formation region 17 and the guide surface 50 is formed in the rear corner portion 47 on the other widthwise side. That is, the protruding opening 43 is formed in the other widthwise end portion of the base opening 42 to protrude, and the side end surfaces 44 of the protruding opening 43 are located at the same positions as those of the side end surfaces of the support opening 16 in plan view.

Also, in the modification, the light-source-side terminal 25 is provided in the one widthwise end portion of the terminal formation region 17, though not shown in FIG. 9(*e*). On the other hand, the head-side terminals 18 are disposed on the other widthwise side and obliquely rearwardly of the light-source-side terminal 25 to be spaced apart therefrom. That is, the one light-source-side terminal 25 or a plurality of the light-source-side terminals 25 included in the light-source-device-side terminals 51 are disposed at the widthwise outermost positions on one widthwise side (i.e., the light-source-side terminal or terminals 25 are disposed in the terminal formation region 17 without being interposed between the head-side terminals 18).

In the first embodiment shown in FIG. 2, the number of the main-body-side terminals 24 is set to 2 and the number of the light-source-side terminals 25 is set to 1, but the numbers thereof are not particularly limited. For example, the number of the main-body-side terminals 24 can be set to, e.g., 1 or a plural number of not less than 3 and, for example, the number of the light-source-side terminals 25 can also be set to a plural number (of not less than 2).

The numbers of the head-side terminals 18, the external terminals 19, and the head signal wires 15 are not particularly limited, either.

Also, each of the pedestals 35 shown in FIG. 6 is configured to include the pedestal base layer 67, the pedestal conductive layer 68, and the pedestal cover layer 69, but the pedestals 35 are not limited to such a layer configuration.

Such modifications can also achieve the same function/effect as achieved by the first embodiment.

<Second Embodiment>

Figure 10:
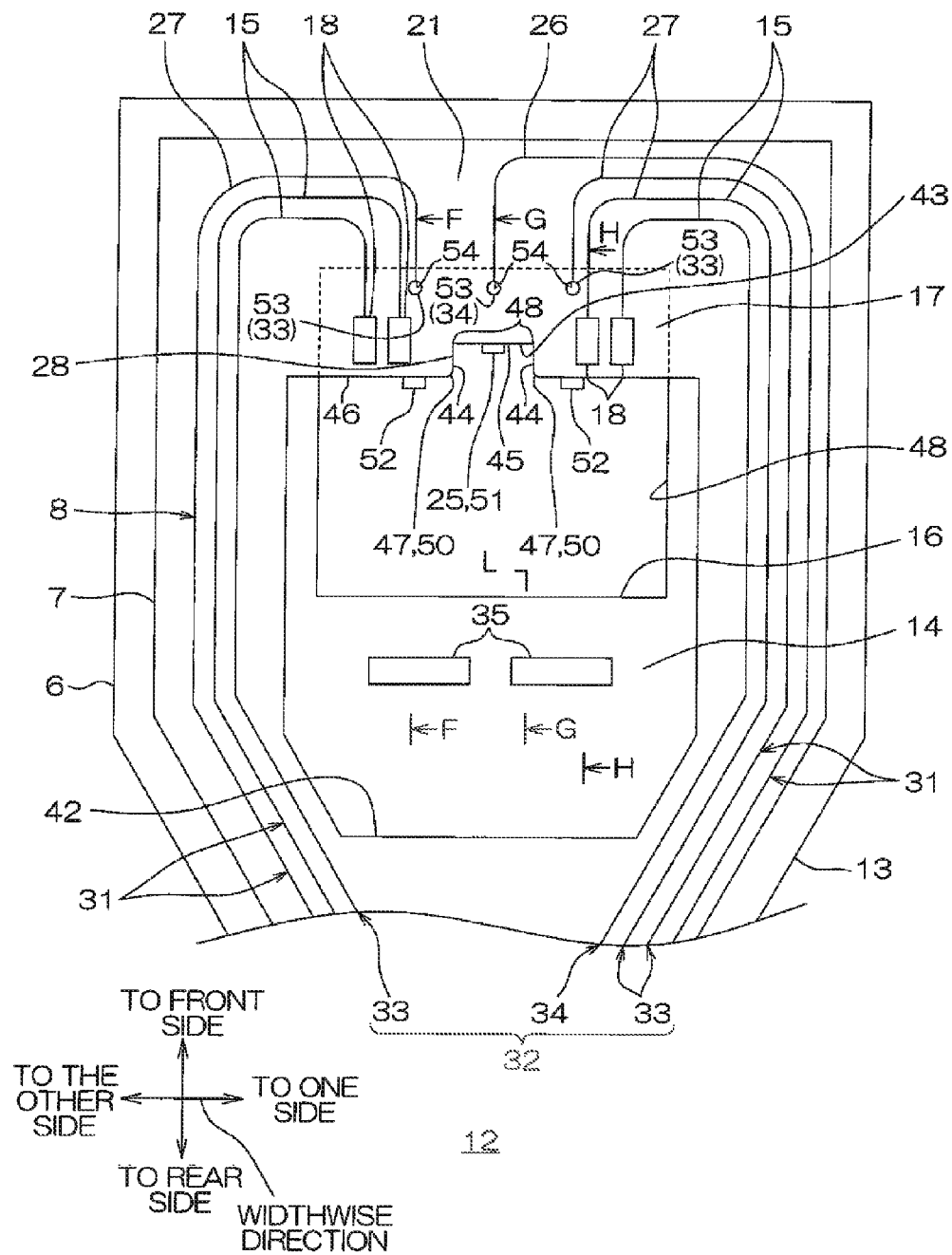
FIG. 10 shows an enlarged plan view of the mounting portion of a suspension board with circuit in a second embodiment of the present invention.
Figure 12A:
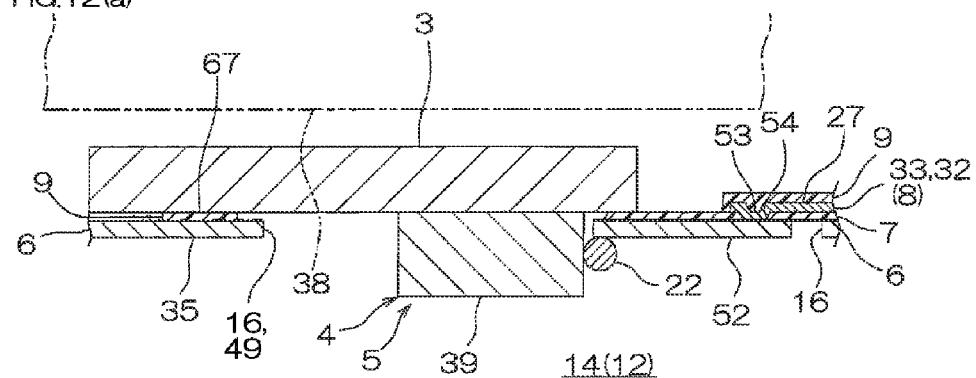
FIG. 12 is an enlarged cross-sectional view of the terminal formation region shown in FIG. 10 along the front-rear direction thereof, FIG. 12(a) showing an enlarged cross-sectional view along the line F-F, FIG. 12(b) showing an enlarged cross-sectional view along the line G-G, and FIG. 12(c) showing an enlarged cross-sectional view along the line H-H.
Figure 12B:
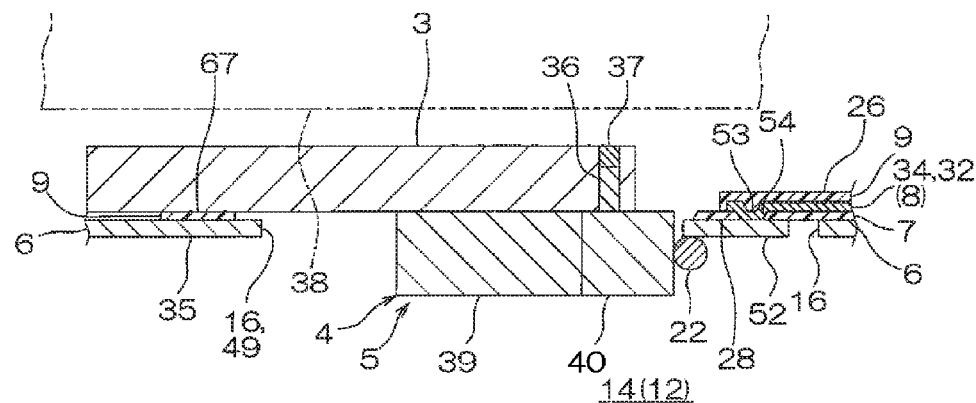
Figure 12C:
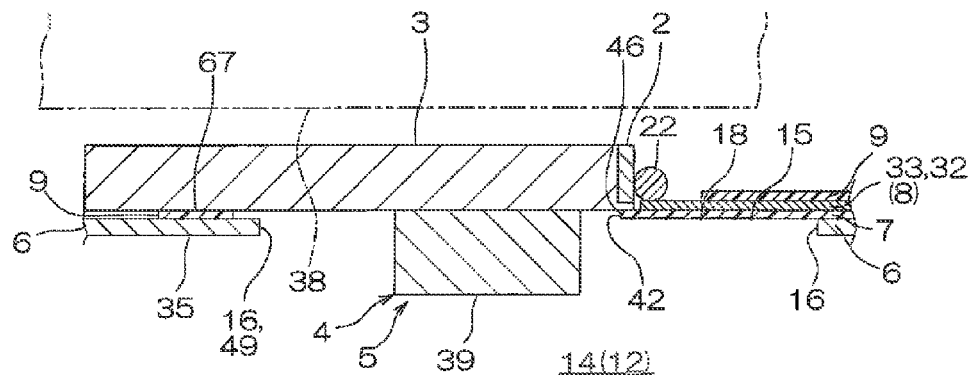

In FIGS. 10 to 12, the same members as used in the first embodiment are designated by the same reference numerals and a detailed description thereof is omitted.

In FIGS. 10 and 12, each of the main-body-side patterns 33 and the light-source-side pattern 34 includes a conductive portion 53 electrically connected to the main body signal wire 27 or the light source wire 26. The conductive portions 53 fill respective base through holes 54 formed in the insulating base layer 7 and are formed continuously to the main body signal wires 27 and the light source wire 26.

Each of the base through holes 54 is formed in the insulating base layer 7 to have a generally circular shape in plan view and extend through the insulating base layer 7 in the thickness direction thereof.

As shown in FIGS. 12(*a*) and 12(*b*), the lower ends of the conductive portions 53 are provided with support terminals 52.

As shown in FIG. 11, under the insulating base layer 7 (on the other side in the thickness direction), the three support terminals 52 are laminated to be spaced apart from each other in the widthwise direction. Each of the support terminals 52 is formed in a generally rectangular shape in bottom view which is elongated in the front-rear direction. The rear end surfaces of the support terminals 52 corresponding to the conductive portions 53 in the main-body-side patterns 33 and the rear end surface of the support terminal 52 corresponding to the conductive portion 53 in the light-source-side pattern 34 are disposed at the same positions as those of the rear end surfaces of the main-body-side terminals 24 and the rear end surface of the light-source-side terminal 25 each shown in FIG. 2 in the first embodiment when projected in the thickness direction. Also, the front end surfaces of the three support terminals 52 are formed at the same position when projected in the widthwise direction. As shown in FIGS. 12(*a*) and 12(*b*), the support terminals 52 are formed over the lower surfaces of the conductive portions 53 and the lower surface of the insulating base layer 7 around the conductive portions 53 and disposed to be spaced apart from the peripheral metal supporting board 6.

The support terminals 52 are each formed of the same metal material (conductive material) as the metal material forming the metal supporting board 6. As shown in FIG. 12, the thickness of each of the support terminals 52 is the same as the thickness of the metal supporting board 6.

The support terminals 52 corresponding to the conductive portions 53 in the main-body-side patterns 33 and the support terminal 52 corresponding to the conductive portion 53 in the light-source-side pattern 34 are respectively electrically connected to the main body signal wires 27 and the light source wire 26 via the conductive portions 53. On the other hand, the support terminals 52 are insulated from the peripheral metal supporting board 6.

When the metal supporting board 6 is trimmed, each of the support terminals 52 is simultaneously formed into the foregoing shape.

Alternatively, each of the support terminals 52 can also be formed into the foregoing shape in a step other than the step of trimming the metal supporting board 6.

The second embodiment can also achieve the same function/effect as achieved by the first embodiment.

<Third Embodiment>

In FIGS. 13 to 16, the same members as used in the first embodiment are designated by the same reference numerals and a detailed description thereof is omitted. In FIGS. 13 and 14, a second insulating base layer 56 described later is omitted to clearly show the relative positioning of the second insulating base layer 56 and the metal supporting board 6.

Figure 15A:
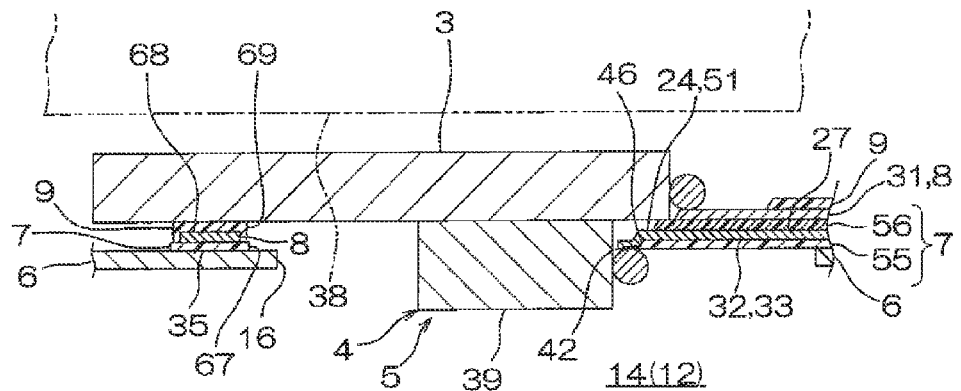
FIG. 15 is an enlarged cross-sectional view of the terminal formation region shown in FIG. 13 along the front-rear direction thereof, FIG. 15(a) showing an enlarged cross-sectional view along the line I-I, FIG. 15(b) showing an enlarged cross-sectional view along the line J-J, and FIG. 15(c) showing an enlarged cross-sectional view along the line K-K.
Figure 15B:
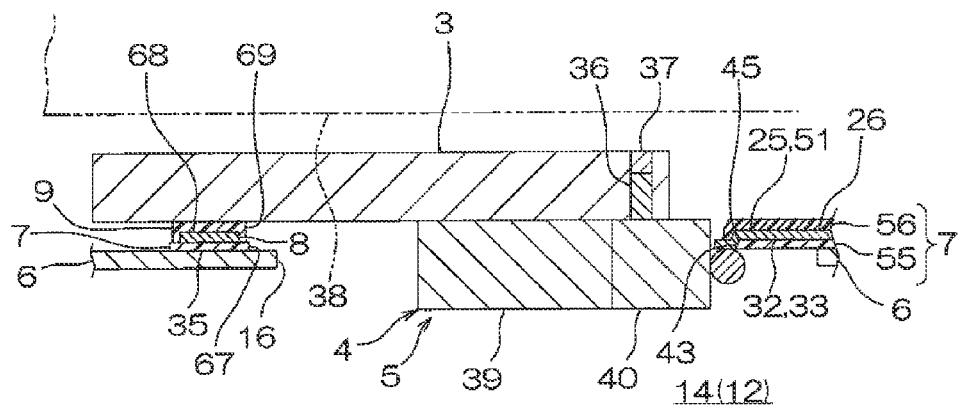
Figure 15C:
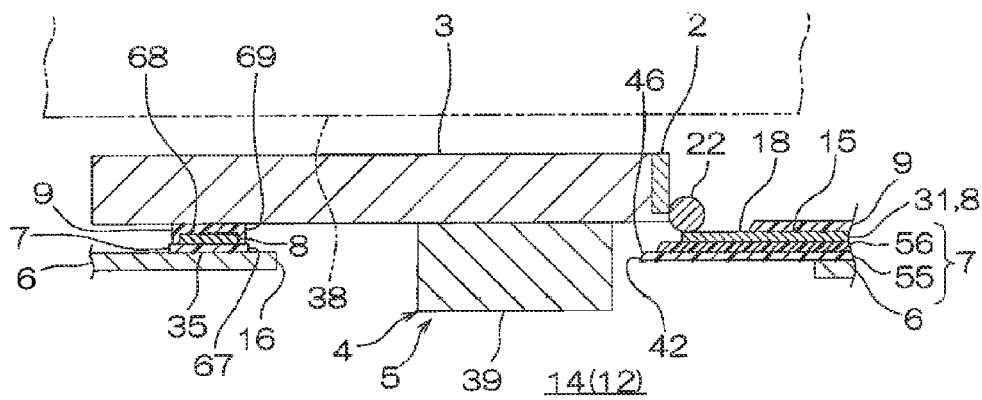

In the third embodiment, as shown in FIG. 15, the insulating base layer 7 includes a first insulating base layer 55, and the second insulating base layer 56 formed thereon.

The first insulating base layer 55 is formed in the same shape as that of the insulating base layer 7 in the first embodiment. On the upper surface of the first insulating base layer 55, the second conductive pattern 32 is formed.

The second insulating base layer 56 is formed so as to cover the second conductive pattern 32. Specifically, as shown in FIGS. 15(*a*) and 15(*b*), the second insulating base layer 56 is formed in a pattern covering the main body signal wires 27 (see FIG. 6(*a*)) in the main-body-side patterns 33, and the light source wire 26 and the front end portion of the light-source-side terminal 25 (see FIG. 6(*b*)) in the light-source-side pattern 34, while exposing the main-body-side terminals 24 (see FIG. 6(*a*)) and the first supply-side terminals 23 (see FIG. 1) in the main-body-side patterns 33, and the rear end portion of the light-source-side terminal 25 (see FIG. 6(*b*)) and the second supply-side terminal 41 (see FIG. 1) in the light-source-side pattern 34.

As shown in FIGS. 15(*a*) and 15(*b*), on the upper surface of the second insulating base layer 56, the first conductive pattern 31 is formed.

The first insulating base layer 55 and the second insulating base layer 56 are formed in accordance with the same method as used to form the insulating base layer 7 in the first embodiment.

The embodiment shown in FIGS. 13 to 15 can also achieve the same function/effect as achieved by the embodiment shown in FIGS. 4 and 9.

<Modification>

In the first to third embodiments, as shown in FIGS. 6, 7, and 12, the receiving portion 28 is formed by cutting the insulating base layer 7 throughout (all the way along) the thickness direction. However, as shown in FIG. 16, the receiving portion 28 can also be formed by cutting the insulating base layer 7 halfway in the thickness direction.

Figure 16:
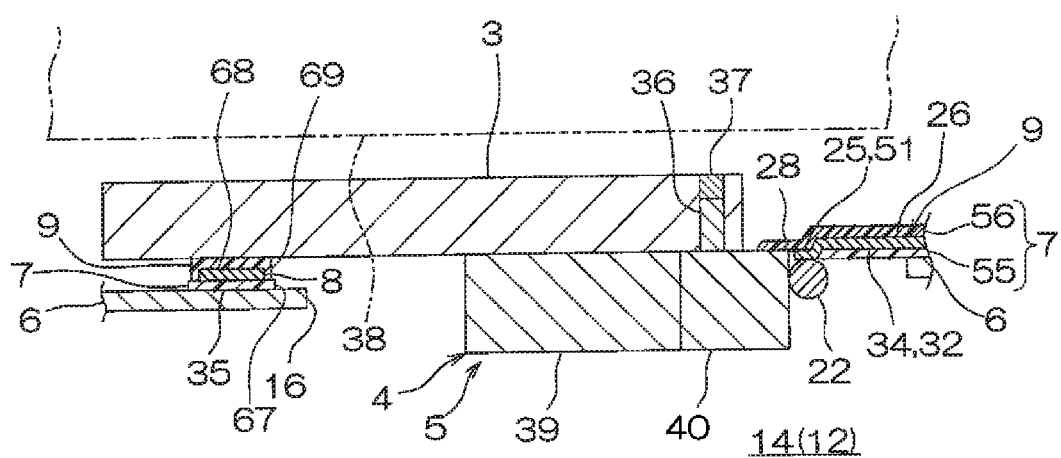
FIG. 16 is an enlarged cross-sectional view of the terminal formation region of the suspension board with circuit in the third embodiment, which corresponds to FIG. 15(b).

As shown in FIG. 16, the receiving portion 28 is formed by cutting the lower portion of the insulating base layer 7. Specifically, the receiving portion 28 is formed by cutting only the first insulating base layer 55 of the first and second insulating base layers 55 and 56. As a result, as shown in FIGS. 14 and 16, the receiving portion 28 is defined by the side end surfaces 44 and the front end surface 45 of the first insulating base layer 55 and the lower surface of the second insulating base layer 56.

As shown in FIG. 16, with the lower surface of the second insulating base layer 56 in the receiving portion 28, the upper surface of the front end portion of the light source 40 is in contact. This allows the receiving portion 28 to receive the light source 40.

The modification can also achieve the same function/effect as achieved by the foregoing first to third embodiments.

While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. A suspension board with circuit for mounting thereon a slider/light source unit provided with a slider on which a magnetic head is mounted, and a light source device including a main body, and a light source provided to protrude from the main body, the suspension board with circuit comprising:
   a receiving portion formed therein to be operative to receive the light source;
   a guide surface for guiding the light source to the receiving portion when the slider/light source unit is mounted;
   a metal supporting board extending in a longitudinal direction thereof; and
   an insulating base layer laminated on one side of the metal supporting board in a thickness direction thereof,
   wherein a support opening is formed on the metal supporting board,
   wherein, in the insulating base layer, a base opening is formed to partially overlap the support opening in the thickness direction and a protruding opening is formed to protrude from one longitudinal end portion of the base opening toward one side of the base opening in the longitudinal direction,
   wherein the receiving portion defines the protruding opening,
   wherein, when the slider/light source unit is mounted, the main body is contained in the base opening and the light source is inserted into the protruding opening, and
   wherein the guide surface is formed from an end surface of the protruding opening.

2. A suspension board with circuit according to claim 1, wherein the guide surface is at least one of a curved surface or an inclined surface inclined with respect to a direction in which the light source protrudes, the guide surface being configured to guide the slider/light source unit to a position at which the slider/light source unit is to be mounted.

3. A suspension board with circuit according to claim 1, further comprising:
   light-source-device-side terminals each laminated on one side or the other side of the insulating base layer in the thickness direction and connected to the light source device, wherein
   the light-source-device-side terminals include:
   a main-body-side terminal connected to the main body; and
   a light-source-side terminal connected to the light source and disposed downstream of the main-body-side terminal in the direction in which the light source protrudes.

\* \* \* \* \*